US010227499B2

(12) United States Patent
Maeda

(10) Patent No.: US 10,227,499 B2
(45) Date of Patent: Mar. 12, 2019

(54) WATER-BASED INK

(71) Applicant: KAO CORPORATION, Tokyo (JP)

(72) Inventor: Takahiro Maeda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/570,123

(22) PCT Filed: Apr. 22, 2016

(86) PCT No.: PCT/JP2016/062815
§ 371 (c)(1),
(2) Date: Oct. 27, 2017

(87) PCT Pub. No.: WO2016/181797
PCT Pub. Date: Nov. 17, 2016

(65) Prior Publication Data
US 2018/0142110 A1 May 24, 2018

(30) Foreign Application Priority Data

May 8, 2015 (JP) .................................. 2015-096036
Dec. 25, 2015 (JP) .................................. 2015-255303

(51) Int. Cl.
C09D 11/322 (2014.01)
C09D 11/38 (2014.01)
C09D 11/10 (2014.01)
C09D 11/106 (2014.01)
B41J 2/01 (2006.01)
B41M 5/00 (2006.01)
C09D 11/30 (2014.01)

(52) U.S. Cl.
CPC ............... C09D 11/322 (2013.01); B41J 2/01 (2013.01); B41M 5/00 (2013.01); C09D 11/10 (2013.01); C09D 11/106 (2013.01); C09D 11/30 (2013.01)

(58) Field of Classification Search
CPC ....... C09D 11/322; C09D 11/38; C09D 11/10; C09D 11/106; B41J 2/01; B41M 5/00
USPC ...................................................... 106/31.86
See application file for complete search history.

(56) References Cited

U.S. PATENT DOCUMENTS

| 9,670,374 B2* | 6/2017 | Wakabayashi | ........ C09D 11/322 |
| 9,878,558 B2* | 1/2018 | Eguchi | .................. C09D 11/322 |
| 2003/0087988 A1* | 5/2003 | Nakano | .................. C09D 11/30 523/160 |
| 2003/0106462 A1 | 6/2003 | Yatake et al. | |
| 2008/0064786 A1* | 3/2008 | Tanaka | .................. C09D 11/322 523/201 |
| 2008/0143785 A1* | 6/2008 | Houjou | ................. B41J 2/14233 347/45 |
| 2011/0152442 A1* | 6/2011 | Doi | ........................ C09D 11/32 524/524 |
| 2011/0164086 A1* | 7/2011 | Ggoto | .................. C09D 11/326 347/21 |
| 2012/0105558 A1* | 5/2012 | Li | .......................... C09D 11/326 347/100 |
| 2012/0219715 A1* | 8/2012 | Yoshida | ................. C09D 11/38 427/256 |
| 2013/0250002 A1 | 9/2013 | Nishimura et al. | |
| 2014/0066550 A1 | 3/2014 | Shigemori et al. | |

(Continued)

FOREIGN PATENT DOCUMENTS

JP 2008-156465 A 7/2008
JP 2008-208153 A 9/2008

(Continued)

OTHER PUBLICATIONS

English translation of JP 2008/156465, Jul. 2008; 27 pages.*
English translation of WO 2017/138437, Aug. 2017; 25 pages.*
European Patent Office Communication and extended search report issued in the corresponding European Patent Application No. 16792522.1 dated Jan. 17, 2018.
International Search Report (PCT/ISA/210) issued in PCT/JP2016/062815, dated May 31, 2016.
Written Opinion (PCT/ISAI237) issued in PCT/JP2016/062815, dated May 31, 2016.

Primary Examiner — Helene Klemanski
(74) Attorney, Agent, or Firm — Birch, Stewart, Kolash & Birch, LLP

(57) ABSTRACT

The present invention relates to [1] a water-based ink including pigment-containing water-insoluble polymer particles A, water-insoluble vinyl-based polymer particles B and an organic solvent C, in which the water-insoluble polymer particles A are obtained by crosslinking polymer particles; the water-insoluble polymer particles B include at least one material selected from the group consisting of water-insoluble vinyl-based polymer particles and the like; the organic solvent C includes at least one compound selected from the group consisting of diethylene glycol monobutyl ether and diethylene glycol monoisobutyl ether, and propylene glycol, in which a total content of diethylene glycol monobutyl ether and diethylene glycol monoisobutyl ether in the water-based ink is not less than 0.8% by mass, and a content of an organic solvent having a boiling point of higher than 250° C. in the water-based ink is not more than 5% by mass; and a content of water in the water-based ink is not less than 45% by mass, and [2] an ink-jet printing method including the step of printing characters or images on a recording medium using the aforementioned water-based ink. The water-based ink of the present invention is excellent in long-term storage stability as well as ejection stability upon ink-jet printing, and can be improved in image quality of printed characters or images, rub fastness, water resistance, solvent resistance and adhesion to a substrate with a high level and a good balance when printed on a non-water absorbing recording medium.

14 Claims, No Drawings

(56) References Cited

U.S. PATENT DOCUMENTS

| | | | | |
|---|---|---|---|---|
| 2015/0337149 A1* | 11/2015 | Wakabayashi | ....... | C09D 11/322 347/20 |
| 2015/0344713 A1* | 12/2015 | Mizushima | .......... | C09D 11/322 347/100 |
| 2016/0130453 A1 | 5/2016 | Eguchi et al. | | |
| 2017/0259602 A1* | 9/2017 | Kutsuwa | ................... | B41J 2/01 |

FOREIGN PATENT DOCUMENTS

| | | |
|---|---|---|
| JP | 2008-260139 A | 10/2008 |
| JP | 2010-047700 A | 3/2010 |
| JP | 2013-076017 A | 4/2013 |
| JP | 2013-194226 A | 9/2013 |
| WO | WO 01/96483 A1 | 12/2001 |
| WO | WO 2012/124643 A1 | 9/2012 |
| WO | WO 2014/196578 A1 * | 12/2014 |
| WO | WO 2016/042875 A1 * | 3/2016 |
| WO | WO 2017-138437 A1 | 8/2017 |

\* cited by examiner

WATER-BASED INK

FIELD OF THE INVENTION

The present invention relates to a water-based ink and an ink-jet printing method.

BACKGROUND OF THE INVENTION

In ink-jet printing methods, droplets of ink are directly projected onto a recording medium from very fine nozzles and allowed to adhere to the recording medium to form characters or images. The ink-jet printing methods have become rapidly spread because of various advantages such as easiness of full coloration, low cost, capability of using a plain paper as the recording medium, non-contact with printed characters or images, etc.

In recent years, in order to impart good weathering resistance and good water resistance to printed materials, an ink containing a pigment as a colorant has been extensively used. In addition, from the standpoint of improving ejection stability and storage stability of ink, in order to stably compounding a pigment into a water-based ink, the technologies for enclosing the pigment in a polymer using a dispersant capable of modifying a surface of the pigment, etc., have been developed.

On the other hand, it has been required to print characters or images not only on a high-absorptive recording medium such as those recording media conventionally called a plain paper and a copying paper, etc., but also on a recording medium for commercial printing purposes such as a low-water absorbing coated paper such as an offset coated paper or a non-liquid absorbing resin film such as a polyvinyl chloride resin film, a polypropylene resin film and a polyester resin film.

It is known that when characters or images are printed on the low-water absorbing or non-water absorbing recording medium by the ink-jet printing methods, there tend to occur problems such as prolonged drying time owing to slow absorption or no absorption of liquid components, and deterioration in rub fastness in an initial stage of the printing.

Hitherto, when printing characters or images on the low-water absorbing or non-water absorbing substrate, a solvent-based pigment ink using an organic solvent as a dispersing medium and a UV-curing ink have been mainly employed. This is because when using the aforementioned inks, there occurs such a phenomenon that the organic solvent is penetrated into the low-water absorbing or non-water absorbing substrate and causes swelling of the surface of the substrate to thereby fix the pigment in the substrate, or a firm resin coating is formed on the substrate after printing, so that it is possible to improve anti-bleeding properties and rub fastness of these inks.

However, these conventional inks tend to have such a problem that a large amount of the organic solvent is diffused into air upon drying to cause adverse influence on environments, or a radical initiator or a polymerizable monomer used in the UV-curing ink raises a risk concerning safety. For this reason, at a present time, development of a water-based pigment ink having a less burden on working environments and natural environments has proceeded.

On the other hand, almost all of the conventional water-based pigment inks have such a problem that they are incapable of forming clear characters or images having a high image quality on a low-water absorbing or non-water absorbing substrate.

In consequence, to solve these conventional problems, JP 2008-260139A (Patent Literature 1) discloses a recording method using an aqueous ink containing a glycol ether or an alkanediol in a total amount of 5 to 30% by mass and further containing a fixing resin having a surface tension of 20 to 30 mN/m in an amount of 2 to 20% by mass, in which it is possible to obtain a high-quality print on a non-water absorbing recording medium having a thickness of 5 to 70 µm which is capable of maintaining a uniform thickness without causing any defects such as deformation of the recording medium.

Also, JP 2013-76018A (Patent Literature 2) discloses a water-based pigment ink composition containing a pigment, water, an organic solvent, a pigment dispersant, a resin and a silicone-based compound wherein the organic solvent contains at least one specific glycol monoalkyl ester in an amount of 10 to 30% by mass on the basis of a whole amount of the ink composition, and the resin is in the form of a water-dispersible resin having a glass transition temperature of not lower than 70° C., in which the ink composition is used as an ink composition for ink-jet printing which can exhibit good storage stability as well as good rub fastness, and is free from distortion or bleeding of printed characters or images on a non-water absorbing substrate.

SUMMARY OF THE INVENTION

The present invention relates to a water-based ink including pigment-containing water-insoluble polymer particles A, pigment-free water-insoluble polymer particles B, an organic solvent C and water, in which:

the pigment-containing water-insoluble polymer particles A are obtained by crosslinking pigment-containing water-insoluble polymer particles (a) in an aqueous medium;

the water-insoluble polymer particles B include at least one material selected from the group consisting of water-insoluble vinyl-based polymer particles, water-insoluble polyester resin particles and water-insoluble polyurethane resin particles;

the organic solvent C includes at least one compound selected from the group consisting of diethylene glycol monobutyl ether and diethylene glycol monoisobutyl ether, and propylene glycol, in which a total content of diethylene glycol monobutyl ether and diethylene glycol monoisobutyl ether in the water-based ink is not less than 0.8% by mass, and a content of an organic solvent having a boiling point of higher than 250° C. in the water-based ink is not more than 5% by mass; and a content of water in the water-based ink is not less than 45% by mass.

DETAILED DESCRIPTION OF THE INVENTION

It has been found that the printed materials produced using the inks described in Patent Literatures 1 and 2 have poor resistance to alcohols and water, and are insufficient in adhesion to the substrates.

The present invention relates to a water-based ink that is not only capable of maintaining good long-term storage stability and good ejection stability upon ink-jet recording (printing), but also can exhibit clear image quality without occurrence of bleeding or mottling (unevenness) and can be improved in rub fastness, water resistance, solvent resistance and adhesion to a substrate with a high level and a good balance even when printed on a non-water absorbing recording medium, and an ink-jet printing method.

Meanwhile, the term "non-water absorbing" as used in the present specification is a concept that is intended to include both of low-liquid absorbing properties and non-liquid absorbing properties, and it means that a water absorption of the recording medium is not less than 0 g/m² and not more than 2.5 g/m² as measured under such a condition that a contact time between the recording medium and pure water is 100 milliseconds.

That is, the present invention relates to the following aspects [1] and [2]. [1] A water-based ink including pigment-containing water-insoluble polymer particles A, pigment-free water-insoluble polymer particles B, an organic solvent C and water, in which:

the pigment-containing water-insoluble polymer particles A are obtained by crosslinking pigment-containing water-insoluble polymer particles (a) in an aqueous medium;

the water-insoluble polymer particles B include at least one material selected from the group consisting of water-insoluble vinyl-based polymer particles, water-insoluble polyester resin particles and water-insoluble polyurethane resin particles;

the organic solvent C includes at least one compound selected from the group consisting of diethylene glycol monobutyl ether and diethylene glycol monoisobutyl ether, and propylene glycol, in which a total content of diethylene glycol monobutyl ether and diethylene glycol monoisobutyl ether in the water-based ink is not less than 0.8% by mass, and a content of an organic solvent having a boiling point of higher than 250° C. in the water-based ink is not more than 5% by mass; and a content of water in the water-based ink is not less than 45% by mass. [2] An ink-jet printing method including the step of printing characters or images on a recording medium using the water-based ink according to the aforementioned aspect [1], in which the recording medium has a water absorption of not less than 0 g/m² and not more than 2.5 g/m² as measured in a pure water contact time of 100 milliseconds.

According to the present invention, there are provided a water-based ink that is not only capable of maintaining good long-term storage stability and good ejection stability upon ink-jet recording (printing), but also can exhibit clear image quality without occurrence of bleeding or mottling (unevenness) and can be improved in rub fastness, water resistance, solvent resistance and adhesion to a substrate with a high level and a good balance even when printed on a non-water absorbing recording medium, and an ink-jet printing method.

[Water-Based Ink]

The water-based ink of the present invention is characterized by including pigment-containing water-insoluble polymer particles A (hereinafter also referred to merely as "pigment-containing polymer particles A"), pigment-free water-insoluble polymer particles B (hereinafter also referred to merely as "water-insoluble polymer particles B"), an organic solvent C and water, in which:

the pigment-containing water-insoluble polymer particles A are obtained by crosslinking polymer particles (a) containing a pigment (hereinafter also referred to merely as "pigment-containing polymer particles (a) ") in an aqueous medium;

the water-insoluble polymer particles B include at least one material selected from the group consisting of water-insoluble vinyl-based polymer particles, water-insoluble polyester resin particles and water-insoluble polyurethane resin particles;

the organic solvent C includes at least one compound selected from the group consisting of diethylene glycol monobutyl ether (hereinafter also referred to merely as "BDG") and diethylene glycol monoisobutyl ether (hereinafter also referred to merely as "iBDG"), and propylene glycol, in which a total content of BDG and iBDG in the water-based ink being not less than 3% by mass, and a content of an organic solvent having a boiling point of higher than 250° C. in the water-based ink is not more than 5% by mass; and a content of water in the water-based ink is not less than 45% by mass.

The water-based ink of the present invention can be improved in not only long-term storage stability, but also image quality of printed characters or images, rub fastness, water resistance, solvent resistance and adhesion to a substrate with a high level and a good balance when printed on a non-water absorbing recording medium, and therefore can be suitably used as a water-based ink for flexo printing, gravure printing or ink-jet printing. In addition, the water-based ink of the present invention is excellent in continuous ejection stability when used in an ink-jet printing method, and therefore can be preferably used as a water-based ink for ink-jet printing.

In accordance with the present invention, it is possible to obtain a water-based ink that is excellent in long-term storage stability and ejection stability upon ink-jet printing, and can be improved in image quality of printed characters or images, rub fastness, water resistance, solvent resistance and adhesion to a substrate with a high level and a good balance when printed on a non-water absorbing recording medium. The reason why the aforementioned advantages can be attained by the present invention is considered as follows, though it is not necessarily clearly determined yet.

In the present invention, it is considered that since the pigment-containing polymer particles A are produced by crosslinking the pigment-containing polymer particles (a), the water-insoluble polymer particles A are prevented from being swelled even in the presence of the organic solvent C, so that the resulting water-based ink can be improved in storage stability. In addition, it is considered that since the pigment-containing polymer particles A are used in combination with the pigment-free water-insoluble polymer particles B in the form of vinyl-based polymer particles as a fixing resin, the pigment-containing polymer particles A and the water-insoluble polymer particles B are compatibilized with each other on the recording medium, so that it is possible to form a coating film in which the water-insoluble polymer particles B acting as the fixing resin are uniformly dispersed, on the printed surface of the recording medium. As a result, it is considered that the resulting water-based ink can be improved in rub fastness, water resistance, solvent resistance and adhesion to a substrate with a high level and a good balance.

Furthermore, it is considered that since the organic solvent C used in the water-based ink contains at least one compound selected from the group consisting of BDG and iBDG which have a relatively low boiling point as well as propylene glycol, it is possible to prevent the pigment-containing polymer particles A and the water-insoluble polymer particles B from suffering from swelling with the organic solvent C or dissolution therein, so that the resulting water-based ink can be improved in affinity to a non-water absorbing medium without deterioration in drying properties thereof. As a result, it is considered that the water-based ink can be enhanced in wet spreadability over the non-water absorbing medium, so that it is possible to attain good image quality. Also, it is considered that if the content of an organic solvent having a boiling point of higher than 250° C. in the organic solvent C is excessively large, the resulting water-based ink tends to be deteriorated in drying properties after formation of the printed characters or images, and the organic solvent C tends to remain between the pigment-containing polymer particles A and the water-insoluble polymer particles B, so that formation of a uniform coating film of the water-based ink tends to be inhibited.

[Pigment-Containing Water-Insoluble Polymer Particles A]

The average particle size of the pigment-containing water-insoluble polymer particles A used in the present invention is preferably not less than 40 nm, more preferably not less than 50 nm and even more preferably not less than 60 nm, and is also preferably not more than 200 nm, more preferably not more than 150 nm and even more preferably not more than 100 nm, from the viewpoint of improving optical density of the resulting water-based ink.

The average particle size of the pigment-containing water-insoluble polymer particles A may be measured by the method described in Examples below.

<Pigment>

The pigment used in the present invention is not particularly limited, and may be either an organic pigment or an inorganic pigment and may also be used in the form of a mixture thereof.

Examples of the organic pigment include at least one pigment selected from the group consisting of condensed polycyclic pigments such as anthraquinone pigments, quinacridone pigments, indigo pigments, dioxazine pigments, perylene pigments, perinone pigments, isoindolinone pigments, isoindoline pigments, phthalocyanine pigments, quinophthalone pigments and diketopyrrolopyrrole pigments, and azo pigments such as disazo pigments and condensed azo pigments. Of these organic pigments, from the viewpoint of improving color reproducibility of the printed characters or images, preferred is at least one pigment selected from the group consisting of quinacridone pigments, azo pigments and phthalocyanine pigments.

Specific examples of the quinacridone pigments include C.I. PR (Pigment Red) 122, PR 192, PR 202, PR 207 and PR 209; and C.I. PV (Pigment Violet) 19, etc. Of these quinacridone pigments, preferred is at least one pigment selected from the group consisting of C.I. PR 122 and C.I. PV 19. Specific examples of the azo pigments include C.I. PY (Pigment Yellow) 74, PY 151, PY 154, PY 155, PY 180 and PY 213. Of these azo pigments, preferred is at least one pigment selected from the group consisting of C.I. PY 74 and C.I. PY 154. Specific examples of the phthalocyanine pigments include C.I. PB (Pigment Blue) 15:1, PB 15:2, PB 15:3, PB 15:4, PB 15:5, PB 15:6 and PB 16; and PG (Pigment Green) 7 and PG 36. Of these phthalocyanine pigments, preferred is at least one pigment selected from the group consisting of C.I. PB 15:3 and C.I. PB 15:4.

The organic pigment also includes a derivative of the organic pigment as a raw material thereof. The organic pigment derivative may be produced by such a treatment in which a functional group such as a hydroxy group, a carboxy group, a carbamoyl group, a sulfo group, a sulfonamide group and a phthalimidomethyl group is bonded to the surface of the organic pigment.

Examples of the inorganic pigment include carbon blacks and metal oxides such as alumina and titanium dioxide. These inorganic pigments may be treated with a conventionally known hydrophobization agent such as a titanium coupling agent, a silane coupling agent and a higher fatty acid metal salt.

The carbon blacks are preferably used for black inks. The carbon blacks include furnace blacks, thermal lamp blacks, acetylene blacks and channel blacks, and may also be surface-treated carbon blacks.

In addition, the content of the pigment in the water-based ink of the present invention is preferably not less than 1% by mass, more preferably not less than 2% by mass and even more preferably not less than 3% by mass, and is also preferably not more than 25% by mass, more preferably not more than 10% by mass and even more preferably not more than 7% by mass, from the viewpoint of enhancing optical density of the resulting water-based ink.

<Water-Insoluble Polymer P1>

The pigment-containing polymer particles A are obtained by crosslinking the pigment-containing polymer particles (a). As the water-insoluble polymer constituting the pigment-containing polymer particles (a), there may be used a water-insoluble polymer P1 from the viewpoint of enhancing optical density of the resulting water-based ink. The "water-insoluble polymer" as used herein means a polymer exhibiting a solubility in water of 10 g or lower, preferably 5 g or lower and more preferably 1 g or lower when the polymer is dried to a constant weight at 105° C. for 2 hours and then dissolved in 100 g of water at 25° C. In the case where the polymer is in the form of an anionic polymer, the solubility means a solubility in water of the polymer whose anionic groups are neutralized completely, i.e., 100%, with sodium hydroxide.

Examples of the polymer used in the present invention include polyesters, polyurethanes and vinyl-based polymers. Among these polymers, preferred are vinyl-based polymers obtained by addition-polymerizing at least one vinyl monomer selected from the group consisting of vinyl compounds, vinylidene compounds and vinylene compounds from the viewpoint of improving storage stability of the resulting water-based ink.

The water-insoluble polymer P1 is preferably a vinyl-based polymer that is produced by copolymerizing a monomer mixture containing (a) an ionic monomer (hereinafter also referred to merely as a "component (a)") and (b) a hydrophobic monomer (hereinafter also referred to merely as a "component (b)"), and further (c) a nonionic monomer (hereinafter also referred to merely as a "component (c)") (such a mixture is hereinafter also referred to merely as a "monomer mixture").

The vinyl-based polymer contains a constitutional unit derived from the component (a) and a constitutional unit derived from the component (b). The water-insoluble polymer P1 preferably further contains a constitutional unit derived from the nonionic monomer (c), in addition to the constitutional unit derived from the component (a) and the constitutional unit derived from the component (b).

(Ionic Monomer (a))

The ionic monomer (a) is preferably used as a monomer component of the water-insoluble polymer P1 from the viewpoint of stably dispersing the pigment-containing polymer particles A in the water-based ink. Examples of the ionic monomer (a) include an anionic monomer and a cationic monomer. Among these ionic monomers, preferred is the anionic monomer.

Examples of the anionic monomer include a carboxylic acid monomer, a sulfonic acid monomer and a phosphoric acid monomer.

Specific examples of the carboxylic acid monomer include acrylic acid, methacrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid and 3-sulfopropyl (meth) acrylate.

Meanwhile, the "(meth)acrylate" as used herein means an acrylate and/or a methacrylate, and is also hereinlater defined in the same way.

Specific examples of the phosphoric acid monomer include vinylphosphonic acid, vinyl phosphate, bis(methacryloxyethyl) phosphate, diphenyl-2-acryloyloxyethyl phosphate and diphenyl-2-methacryloyloxyethyl phosphate.

Among the anionic monomers, from the viewpoint of improving dispersion stability of the anionic polymer particles in the water-based ink, preferred are the carboxylic acid monomers, more preferred are acrylic acid and methacrylic acid, and even more preferred is methacrylic acid.

(Hydrophobic Monomer (b))

The hydrophobic monomer (b) is used as a monomer component of the water-insoluble polymer P1 from the viewpoint of improving dispersion stability of a water dispersion of the polymer. Examples of the hydrophobic monomer (b) include at least one monomer selected from the group consisting of an alkyl (meth)acrylate, an aromatic group-containing monomer and a macromer, etc. The hydrophobic monomer (b) preferably contains the macromer.

The preferred alkyl (meth)acrylate include those alkyl (meth)acrylates containing an alkyl group having 1 to 22 carbon atoms and preferably 6 to 18 carbon atoms. Examples of the alkyl (meth)acrylates include methyl (meth) acrylate, ethyl (meth)acrylate, (iso)propyl (meth) acrylate, (iso- or tertiary-)butyl (meth) acrylate, (iso)amyl (meth) acrylate, cyclohexyl (meth) acrylate, 2-ethylhexyl (meth) acrylate, (iso)octyl (meth) acrylate, (iso)decyl (meth) acrylate, (iso)dodecyl (meth)acrylate and (iso)stearyl (meth) acrylate.

Meanwhile, the terms "(iso- or tertiary-) " and "(iso)" as used herein mean both of the structure in which any of the groups expressed by "iso or tertiary" and "iso" respectively is present, and the structure in which any of these groups is not present (i.e., normal).

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylate. It is also preferred that these aromatic group-containing monomers are used in combination with each other.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylate include benzyl (meth)acrylate and phenoxyethyl (meth) acrylate. Among these aromatic group-containing (meth) acrylates, more preferred is benzyl (meth) acrylate.

The macromer is in the form of a compound containing a polymerizable functional group at one terminal end thereof and having a number-average molecular weight of from 500 to 100,000, and is used as a monomer component of the water-insoluble polymer P1 from the viewpoint of improving storage stability of the pigment-containing polymer particles A in the water-based ink. The polymerizable functional group bonded to one terminal end of the macromer is preferably an acryloyloxy group or a methacryloyloxy group, and more preferably a methacryloyloxy group.

The number-average molecular weight of the macromer is preferably from 1,000 to 10,000. Meanwhile, the number-average molecular weight of the macromer may be measured by gel chromatography using chloroform containing 1 mmol/L of dodecyl dimethylamine as a solvent and using polystyrene as a reference standard substance.

As the macromer, from the viewpoint of improving dispersion stability of the pigment-containing polymer particles A in the water-based ink, there are preferably used an aromatic group-containing monomer-based macromer and a silicone-based macromer. Among these macromers, more preferred is the aromatic group-containing monomer-based macromer.

Examples of an aromatic group-containing monomer constituting the aromatic group-containing monomer-based macromer include the same aromatic group-containing monomers as described above. Among these aromatic group-containing monomers, preferred are styrene and benzyl (meth)acrylate, and more preferred is styrene.

Specific examples of commercially available products of the styrene-based macromer include "AS-6(S)", "AN-6(S)" and "HS-6(S)" all available from Toagosei Co., Ltd., etc.

Examples of the silicone macromer include organopolysiloxanes containing a polymerizable functional group at one terminal end thereof, etc. Typical examples of the silicone macromer include those compounds represented by the following formula.

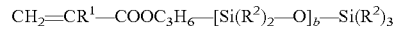

$$CH_2=CR^1-COOC_3H_6-[Si(R^2)_2-O]_b-Si(R^2)_3$$

wherein $R^1$ is a hydrogen atom or a methyl group; $R^2$ is a hydrogen atom or an alkyl group having 1 to 5 carbon atoms; and b is a number of 5 to 60.

Examples of commercially available products of the silicone macromer include "SILAPLANE FM-0711", "SILAPLANE FM-0721" and "SILAPLANE FM-0725" all available from Chisso Corporation, etc.

(Nonionic Monomer (c))

The aforementioned monomer mixture preferably further contains the nonionic monomer (c).

Examples of the nonionic monomer (c) include 2-hydroxyethyl (meth) acrylate, 3-hydroxypropyl (meth)acrylate, polyalkylene glycol (meth)acrylates such as polypropylene glycol (n=2 to 30 wherein n represents an average molar number of addition of oxyalkylene groups: hereinafter defined in the same way) (meth)acrylate, alkoxy polyalkylene glycol (meth)acrylates such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate. Among these nonionic monomers (c), preferred are polypropylene glycol (n=2 to 30) (meth)acrylate and phenoxy (ethylene glycol/propylene glycol copolymer) (meth)acrylate, and more preferred is a combination of polypropylene glycol (n=2 to 30) (meth)acrylate and phenoxy (ethylene glycol/propylene glycol copolymer) (meth)acrylate.

Specific examples of commercially available products of the component (c) include "NK ESTER M-20G", "NK ESTER M-40G", "NK ESTER M-90G" and "NK ESTER M-230G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400" and the like, "BLEMMER PP-500", "BLEMMER PP-800" and the like, "BLEMMER AP-150", "BLEMMER AP-400", "BLEMMER AP-550" and the like, "BLEMMER 50PEP-300", "BLEMMER 50POEP-800B" and "BLEMMER 43PAPE-600B" (which all contain a hydroxy group) all available from NOF Corporation, etc.

These components (a) to (c) may be respectively used alone or in the form of a mixture of any two or more thereof.

Upon production of the water-insoluble polymer P1, the contents of the above components (a) and (c) in the monomer mixture (contents of non-neutralized components; hereinafter defined in the same way) or the contents of the constitutional units derived from the component (a), the component (b) and the component (c) in the water-insoluble polymer P1 are as follows.

The content of the component (a) is preferably not less than 3% by mass, more preferably not less than 4% by mass and even more preferably not less than 5% by mass, and is also preferably not more than 40% by mass, more preferably not more than 30% by mass and even more preferably not more than 25% by mass, from the viewpoint of stably dispersing the pigment-containing polymer particles A in the water-based ink.

The content of the component (b) is preferably not less than 5% by mass, more preferably not less than 10% by mass and even more preferably not less than 40% by mass, and is also preferably not more than 98% by mass, more preferably not more than 80% by mass and even more preferably not more than 70% by mass, from the viewpoint of improving dispersion stability of the pigment-containing polymer particles A in the water-based ink.

The content of the component (c) is not less than 0% by mass. In the case where the component (c) is further used in addition to the components (a) and (b), the content of the component (c) is preferably not less than 2% by mass, more preferably not less than 4% by mass and even more preferably not less than 6% by mass, and is also preferably not more than 30% by mass, more preferably not more than 25% by mass and even more preferably not more than 20% by mass, from the viewpoint of improving dispersion stability of the pigment-containing polymer particles A in the water-based ink.

In addition, the weight ratio of the component (a) to the component (b) [component (a)/component (b)] in the monomer mixture, i.e., the weight ratio of the constitutional unit derived from the salt-forming group-containing monomer (a) (in the case where two or more constitutional units derived from the salt-forming group-containing monomer (a) are present, a total amount of these constitutional units) to the constitutional unit derived from the hydrophobic monomer (b) (in the case where two or more constitutional units derived from the hydrophobic monomer (b) are present, a total amount of these constitutional units) [(a)/(b)] is preferably not less than 0.01, more preferably not less than 0.02 and even more preferably not less than 0.03, and is also preferably not more than 1.0, more preferably not more than 0.7 and even more preferably not more than 0.5, from the viewpoint of improving dispersion stability of the pigment-containing polymer particles A in the water-based ink as well as from the viewpoint of enhancing optical density of the resulting water-based ink.

<Production of Water-Insoluble Polymer P1>

The water-insoluble polymer P1 may be produced by copolymerizing the above monomer mixture by known polymerization methods. Among the polymerization methods, preferred is a solution polymerization method.

The solvent used in the solution polymerization method is not particularly limited, and as the solvent, there may be mentioned at least one polar organic solvent selected from the group consisting of aliphatic alcohols having not less than 1 and not more than 8 carbon atoms, ketones, ethers and esters. Specific examples of the solvent include aliphatic alcohols having 1 to 3 carbon atoms and ketones having 3 to 6 carbon atoms, such as methanol, ethanol, acetone, methyl ethyl ketone and methyl isobutyl ketone. Of these solvents, preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kinds of polymerization initiators used, etc. The polymerization temperature is preferably not lower than 50° C. and more preferably not lower than 55° C., and is also preferably not higher than 90° C. and more preferably not higher than 85° C. The polymerization time is preferably not less than 1 hour and more preferably not less than 1.5 hours, and is also preferably not more than 20 hours and more preferably not more than 10 hours. Furthermore, the atmosphere used in the polymerization is preferably a nitrogen gas atmosphere or an atmosphere of an inert gas such as argon.

The water-insoluble polymer P1 is preferably used in the form of a polymer solution as such without removing the solvent used in the polymerization reaction therefrom from the viewpoint of enhancing productivity of the water dispersion of the pigment-containing polymer particles A.

The solid content of the thus obtained solution of the water-insoluble polymer P1 is preferably not less than 30% by mass and more preferably not less than 35% by mass, and is also preferably not more than 60% by mass and more preferably not more than 50% by mass, from the viewpoint of enhancing productivity of the water dispersion of the pigment-containing polymer particles A.

After completion of the polymerization reaction, the polymer thus produced may be isolated from the reaction solution by a known method such as reprecipitation and removal of the solvent by distillation. The thus obtained polymer may also be subjected to reprecipitation, membrane separation, chromatography, extraction, etc., for removing unreacted monomers, etc., therefrom.

The weight-average molecular weight of the water-insoluble polymer P1 used in the present invention is preferably not less than 5,000, more preferably not less than 10,000, even more preferably not less than 20,000, further even more preferably not less than 30,000 and still further even more preferably not less than 40,000, and is also preferably not more than 500,000, more preferably not more than 400,000, even more preferably not more than 300,000 and further even more preferably not more than 200,000, from the viewpoint of improving dispersion stability of the pigment-containing polymer particles A in the resulting water-based ink as well as from the viewpoint of enhancing optical density of the water-based ink.

Meanwhile, the weight-average molecular weight may be measured by the method described in Examples below.

<Production of Pigment-Containing Water-Insoluble Polymer Particles A>

The pigment-containing water-insoluble polymer particles A (pigment-containing polymer particles A) can be efficiently produced in the form of a water dispersion thereof by the process including the following steps (1) to (3).

Step (1): subjecting a mixture containing the water-insoluble polymer P1. the organic solvent, the pigment and water to dispersion treatment to obtain a dispersion of the pigment-containing water-insoluble polymer particles;

Step (2): removing the organic solvent from the dispersion obtained in the step (1) to obtain a water dispersion of the pigment-containing water-insoluble polymer particles (a) (pigment-containing polymer particles (a)); and Step (3): mixing the water dispersion obtained in the step (2) with a crosslinking agent to subject the pigment-containing polymer particles (a) to crosslinking treatment, thereby obtaining a water dispersion of the pigment-containing polymer particles A.

(Step (1))

The step (1) is the step of subjecting a mixture containing the water-insoluble polymer P1, the organic solvent, the pigment and water to dispersion treatment to obtain a dispersion of the pigment-containing polymer particles A.

In the step (1), there is preferably used the method in which the water-insoluble polymer P1 is first dissolved in the organic solvent, and then the pigment and water, if required, together with a neutralizing agent, a surfactant and the like, are added to and mixed in the resulting organic solvent solution to obtain a dispersion of an oil-in-water type. The order of addition of the respective components to be added to the organic solvent solution of the water-insoluble polymer P1 is not particularly limited, and it is preferred that water, the neutralizing agent and the pigment are successively added in this order.

The organic solvent used for dissolving the water-insoluble polymer P1 is not particularly limited. Examples of the organic solvent include organic solvents having 2 to 8 carbon atoms, e.g., aliphatic alcohols such as ethanol, isopropanol and isobutanol; ketones such as acetone, methyl ethyl ketone, methyl isobutyl ketone and diethyl ketone; ethers such as dibutyl ether, tetrahydrofuran and dioxane; and esters. Among these organic solvents, preferred are organic solvents having 2 to 6 carbon atoms, and more preferred are ketones such as acetone, methyl ethyl ketone and methyl isobutyl ketone.

When the water-insoluble polymer P1 has been synthesized by the solution polymerization method, the solvent used in the polymerization may be used as such in the step (1).

In the case where the water-insoluble polymer P1 contains an ionic group, the ionic group of the water-insoluble polymer P1 may be neutralized using a neutralizing agent. For example, in the case where the water-insoluble polymer P1 is an anionic polymer, and the neutralizing agent is used for neutralizing the anionic polymer, the pH value of the dispersion obtained by the neutralization is preferably controlled to the range of 7 to 11. Examples of the neutralizing agent include bases such as lithium hydroxide, sodium hydroxide, potassium hydroxide and various amines. In addition, the anionic polymer may be previously neutralized. The degree of neutralization of the anionic group in the water-insoluble polymer P1 is preferably not less than 10 mol %, more preferably not less than 20 mol % and even more preferably not less than 30 mol %, and is also preferably not more than 300 mol %, more preferably not more than 200 mol % and even more preferably not more than 150 mol %, from the viewpoint of improving dispersion stability of the resulting dispersion.

The degree of neutralization as used herein means the value calculated by dividing a mole equivalent amount of the neutralizing agent by a molar amount of the ionic group in the water-insoluble polymer P1.

The content of the pigment in the mixture is preferably not less than 5% by mass and more preferably not less than 10% by mass, and is also preferably not more than 50% by mass and more preferably not more than 40% by mass.

The content of the organic solvent in the mixture is preferably not less than 10% by mass, and is also preferably not more than 70% by mass and more preferably not more than 50% by mass.

The content of the water-insoluble polymer P1 in the mixture is preferably not less than 2% by mass and more preferably not less than 3% by mass, and is also preferably not more than 40% by mass and more preferably not more than 20% by mass. The content of water in the mixture is preferably not less than 10% by mass and more preferably not less than 20% by mass, and is also preferably not more than 70% by mass.

The weight ratio of the pigment to the water-insoluble polymer P1 [pigment/water-insoluble polymer P1] is preferably from 50/50 to 90/10 and more preferably from 60/40 to 80/20 from the viewpoint of improving dispersion stability of the resulting dispersion.

In the step (1), the method of dispersing the mixture is not particularly limited. The pigment-containing polymer particles A may be atomized into fine particles having a desired average particle size only by a substantial dispersion treatment. Preferably, the mixture is first subjected to a preliminary dispersion treatment, and then to the substantial dispersion treatment by applying a shear stress thereto so as to control the average particle size of the obtained pigment-containing polymer particles A to a desired value.

The temperature used in the dispersion treatment in the step (1) is preferably not lower than 0° C., more preferably not lower than 5° C. and even more preferably not lower than 5° C., and is also preferably not higher than 40° C. and more preferably not higher than 30° C. The dispersing time is preferably not less than 1 hour and more preferably not less than 2 hours, and is also preferably not more than 30 hours and more preferably not more than 25 hours.

When subjecting the mixture to the preliminary dispersion treatment, there may be used ordinary mixing or stirring devices such as anchor blades and disper blades. Of these devices, preferred are high-speed stirring mixers.

As a means for applying a shear stress to the mixture in the substantial dispersion treatment, there may be used, for example, kneading machines such as roll mills and kneaders, high-pressure homogenizers such as "Micro Fluidizer" (tradename) available from Microfluidics Corporation and media-type dispersers such as paint shakers and beads mills. Examples of the commercially available media-type dispersers include "Ultra Apex Mill" (tradename) available from Kotobuki Industries Co., Ltd., and "Pico Mill" (tradename) available from Asada Iron Works Co., Ltd. These devices may be used in combination of any two or more thereof. Among these devices, the high-pressure homogenizers are preferably used from the viewpoint of reducing the particle size of the pigment-containing polymer particles A.

The more preferred method of dispersing the mixture is such a method in which the mixture is subjected to the preliminary dispersion treatment using a disper or the like, followed by subjecting the resulting dispersion to the high-pressure dispersion treatment. The term "high-pressure dispersion" as used herein means that the dispersion treatment is conducted under a pressure of not less than 20 MPa.

The pressure used in the aforementioned dispersion treatment is preferably not less than 50 MPa, more preferably not less than 100 MPa and even more preferably not less than 120 MPa, and is also preferably not more than 250 MPa and more preferably not more than 200 MPa, from the viewpoint of reducing the particle size of the pigment-containing polymer particles A and enhancing dispersion treatment efficiency.

(Step (2))

The step (2) is the step of removing the organic solvent from the dispersion obtained in the step (1) to obtain a water dispersion of the pigment-containing polymer particles (a).

In the step (2), by removing the organic solvent from the dispersion by any known methods, it is possible to obtain the water dispersion of the pigment-containing polymer particles (a). The organic solvent is preferably substantially completely removed from the thus obtained water dispersion containing the pigment-containing polymer particles (a). However, the residual organic solvent may be present in the water dispersion unless the objects and advantageous effects of the present invention are adversely affected by the residual organic solvent. The content of the residual organic solvent in the water dispersion is preferably not more than 0.1% by mass and more preferably not more than 0.01% by mass.

In addition, if required, the dispersion may be subjected to heating and stirring treatments before removing the organic solvent therefrom by distillation.

Examples of the apparatus used for removing the organic solvent include a thin film distillation apparatus such as a batch simple distillation device, a reduced pressure distillation device and a flush evaporator, a rotary distillation device and a stirring evaporator.

The temperature of the dispersion upon removing the organic solvent therefrom may be appropriately selected depending upon the kind of organic solvent used. The temperature of the dispersion upon removing the organic solvent therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The removal of the organic solvent from the dispersion is preferably conducted such that the concentration of non-volatile components (solid components) in the dispersion obtained after removing the organic solvent therefrom is preferably not less than 18% by mass, more preferably not less than 20% by mass and even more preferably not less than 22% by mass, and is also preferably not more than 60% by mass, more preferably not more than 40% by mass and even more preferably not more than 35% by mass.

In the thus obtained water dispersion of the pigment-containing polymer particles (a), the solid components of the pigment-containing polymer particles (a) are dispersed in a dispersing medium containing water as a main medium. The configuration of the polymer particles used in the present invention is not particularly limited, and the polymer particles may have any configuration as long as the particles are formed of at least the pigment and the water-insoluble polymer P1. Examples of the configuration of the polymer particles include the particle configuration in which the pigment is enclosed in the polymer, the particle configuration in which the pigment is uniformly dispersed in the polymer, the particle configuration in which the pigment is exposed onto a surface of the respective polymer particles, as well as mixtures of these particle configurations. Among these configurations of the polymer particles, preferred is the particle configuration in which the pigment is at least partially enclosed in the water-insoluble polymer P1, in other words, the particle configuration in which the pigment is at least partially coated with the water-insoluble polymer P1.

(Step (3))

The step (3) is the step of mixing the water dispersion containing the pigment-containing polymer particles (a) which has been obtained in the step (2) with a crosslinking agent to subject the polymer particles to crosslinking treatment, thereby obtaining a water dispersion containing the pigment-containing polymer particles A.

By conducting the step (3), it is possible not only to prevent swelling of the water-insoluble polymer P1 acting as a resin for dispersing the pigment in the organic solvent C, but also to reduce an interaction between the aforementioned polymer and the water-insoluble polymer particles B as a fixing resin, when compounding the resulting water dispersion into the ink, so that the resulting water-based ink can be improved in storage stability.

As the method of subjecting the polymer particles to the crosslinking treatment, there may be mentioned the method in which the mixture of the aforementioned water dispersion and the crosslinking agent is reacted while stirring at a temperature of not lower than 60° C. and preferably not lower than 65° C.

The crosslinking agent is preferably a compound containing two or more functional groups that are capable of reacting with an ionic group of the pigment-containing polymer particles (a) in a molecule thereof. From the viewpoint of well controlling a molecular weight of the resulting crosslinked polymer and improving storage stability thereof, the crosslinking agent is more preferably a compound containing not less than 2 and not more than 6 functional groups in a molecule thereof.

The molecular weight of the crosslinking agent is preferably not less than 120 and more preferably not less than 150, and is also preferably not more than 2000, more preferably not more than 1500 and even more preferably not more than 1000, from the viewpoint of facilitating the crosslinking reaction and improving storage stability of the resulting crosslinked polymer particles.

In addition, from the viewpoint of efficiently subjecting the water-insoluble polymer P1 to crosslinking treatment at the surface thereof, the solubility of the crosslinking agent when dissolved in 100 g of water at 25° C. is preferably not more than 50 g, more preferably not more than 40 g and even more preferably not more than 30 g.

As the aforementioned functional group of the crosslinking agent, there may be mentioned at least one group selected from the group consisting of a hydroxy group, an epoxy group, an aldehyde group, an amino group, a carboxy group, an oxazoline group and an isocyanate group. Among the compounds containing these functional groups, preferred are those compounds containing two or more epoxy groups in a molecule thereof.

When the functional group of the crosslinking agent is an epoxy group, the epoxy equivalent (g/eq) of the crosslinking agent is preferably not less than 90, more preferably not less than 100 and even more preferably not less than 110 from the viewpoint of efficiently subjecting the water-insoluble polymer P1 to crosslinking treatment at the surface thereof, and is also preferably not more than 1000, more preferably not more than 500 and even more preferably not more than 300 from the viewpoint of improving storage stability of the resulting crosslinked polymer particles. Meanwhile, the epoxy equivalent may be measured by the method described in Examples below.

Examples of the compounds containing two or more epoxy groups in a molecule thereof include polyglycidyl ethers such as ethylene glycol diglycidyl ether, polyethylene glycol diglycidyl ether, polypropylene glycol diglycidyl ether, glycerin triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ether. Among these compounds containing two or more epoxy groups in a molecule thereof, preferred are ethylene glycol diglycidyl ether and trimethylolpropane polyglycidyl ether.

Examples of commercially available products of the crosslinking agent include "DENACOL EX"-series products available from Nagase ChemteX Corp., and "EPIOL BE"-series products and "EPIOL B"-series products both available from NOF Corp.

From the viewpoint of improving storage stability of the water dispersion as well as the resulting water-based ink, the amount of the crosslinking agent used may be controlled such that the weight ratio of the crosslinking agent to the water-insoluble polymer P1[ crosslinking agent/water-insoluble polymer P1] is preferably from 0.3/100 to 50/100, more preferably from 1/100 to 40/100 and even more preferably from 3/100 to 25/100.

In addition, the crosslinking agent is used in such an amount as to react with preferably not less than 0.1 mmol, more preferably not less than 0.3 mmol and even more preferably not less than 0.5 mmol of an ionic group of the water-insoluble polymer P1 in terms of an amount of the ionic group per 1 g of the water-insoluble polymer P1, and is also used in such an amount as to react with preferably not more than 20 mmol, more preferably not more than 15 mmol, even more preferably not more than 10 mmol, further even more preferably not more than 5 mmol and still further even more preferably not more than 1.0 mmol of the ionic group of the water-insoluble polymer P1 in terms of an amount of the ionic group per 1 g of the water-insoluble polymer P1.

The pigment-containing polymer particles A obtained by the aforementioned crosslinking treatment preferably contain the ionic group neutralized with the base in an amount of not less than 0.3 mmol and more preferably not less than 0.5 mmol, and also preferably not more than 1.5 mmol, per 1 g of the polymer.

The crosslinking rate of the pigment-containing polymer particles A is preferably not less than 10 mol %, more preferably not less than 20 mol % and even more preferably not less than 30 mol %, and is also preferably not more than 80 mol %, more preferably not more than 60 mol % and even more preferably not more than 50 mol %. The crosslinking rate of the pigment-containing polymer particles A is the value obtained by dividing the number of moles of a reactive group of the crosslinking agent by the number of moles of a reactive group (e.g., an ionic group) contained in the pigment-containing polymer particles (a) which can be reacted with the crosslinking agent.

The content (solid content) of the pigment-containing polymer particles A in the water-based ink is preferably not less than 3.0% by mass, more preferably not less than 4.0% by mass and even more preferably not less than 6.0% by mass, and is also preferably not more than 30% by mass, more preferably not more than 20% by mass, even more preferably not more than 15% by mass and further even more preferably not more than 9.0% by mass, from the viewpoint of improving image quality of printed characters or images as well as adhesion to a substrate when printed on a non-water absorbing medium.

The content of the water-insoluble polymer P1 in the water-based ink is preferably not less than 1.0% by mass, more preferably not less than 2.0% by mass and even more preferably not less than 3.0% by mass, and is also preferably not more than 15% by mass, more preferably not more than 10% by mass and even more preferably not more than 5.0% by mass, from the viewpoint of improving image quality of printed characters or images as well as adhesion to a substrate when printed on a non-water absorbing medium.

<Pigment-Free Water-Insoluble Polymer Particles B>

The pigment-free water-insoluble polymer particles B (hereinafter also referred to merely as "water-insoluble polymer particles B") are preferably at least one material selected from the group consisting of water-insoluble vinyl-based polymer particles, water-insoluble polyester resin particles and water-insoluble polyurethane resin particles. The water-insoluble polymer P2 constituting the water-insoluble polymer particles B is preferably at least one polymer selected from the group consisting of a water-insoluble acrylic polymer, a water-insoluble polyester and a water-insoluble polyurethane. Among these polymer particles, preferred are water-insoluble acrylic polymer particles obtained using the water-insoluble acrylic polymer.

Meanwhile, the term "water-insoluble polymer" as used above has the same definition as described above with respect to the water-insoluble polymer P1.

[Water-Insoluble Acrylic Polymer and Water-Insoluble Acrylic Polymer Particles]

The water-insoluble acrylic polymer used in the present invention (hereinafter also referred to merely as an "acrylic polymer") is preferably in the form of a polymer containing a constitutional unit derived from (meth)acrylic acid and a constitutional unit derived from at least one monomer selected from the group consisting of a (meth)acrylic acid ester, vinyl chloride and vinyl acetate.

Examples of the monomer capable of forming the constitutional unit derived from the (meth)acrylic acid include acrylic acid and methacrylic acid.

Examples of the monomer capable of forming the constitutional unit derived from the (meth)acrylic acid ester include alkyl group-containing (meth)acrylic acid esters and aromatic group-containing (meth)acrylic acid esters.

The alkyl group-containing (meth)acrylic acid esters are preferably those (meth)acrylic acid esters containing an alkyl group having 1 to 22 carbon atoms. Specific examples of the alkyl group-containing (meth)acrylic acid esters include methyl (meth) acrylate, ethyl (meth) acrylate, (iso) propyl (meth) acrylate, (iso- or tertiary-)butyl (meth) acrylate, (iso)amyl (meth) acrylate, cyclohexyl (meth)acrylate, 2-ethylhexyl (meth) acrylate, (iso)octyl (meth) acrylate, (iso)decyl (meth) acrylate, (iso)dodecyl (meth)acrylate and (iso)stearyl (meth)acrylate.

Specific examples of the aromatic group-containing (meth)acrylic acid esters include benzyl (meth)acrylate and phenoxyethyl (meth)acrylate.

The glass transition temperature of the acrylic polymer is preferably not lower than 0° C., more preferably not lower than 5° C., even more preferably not lower than 30° C. and further even more preferably not lower than 50° C., and is also preferably not higher than 90° C., more preferably not higher than 85° C., even more preferably not higher than 80° C. and further even more preferably not higher than 75° C., from the viewpoint of improving adhesion to a substrate.

The water-insoluble acrylic polymer particles used in the present invention may be appropriately synthesized, or may be commercially available products.

(Synthesis of Water-Insoluble Acrylic Polymer Particles)

The water-insoluble acrylic polymer particles may be produced by copolymerizing a mixture of the (meth)acrylic acid and the (meth)acrylic acid ester by known polymerization methods. Examples of the preferred polymerization methods include an emulsion polymerization method and a suspension polymerization method, etc. Among these polymerization methods, more preferred is an emulsion polymerization method.

The polymerization may be carried out in the presence of a polymerization initiator. Examples of the polymerization initiator include persulfates and water-soluble azo polymerization initiators. Of these polymerization initiators, more preferred are persulfates such as ammonium persulfate and potassium persulfate.

Upon conducting the polymerization reaction, a surfactant may also be used therein. Examples of the surfactant include a nonionic surfactant, an anionic surfactant and a cationic surfactant. Of these surfactants, from the viewpoint of improving dispersion stability of the resin particles, preferred is a nonionic surfactant. Examples of the nonionic surfactant include polyoxyethylene alkyl ethers, polyoxyethylene alkyl aryl ethers, polyoxyethylene fatty acid esters, oxyethylene/oxypropylene block copolymers and the like. Of these nonionic surfactants, from the viewpoint of improving dispersion stability of the resin particles, preferred are polyoxyethylene alkyl ethers.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. Furthermore, the polymerization is preferably conducted in a nitrogen gas atmosphere or an atmosphere of an inert gas such as argon.

After completion of the polymerization reaction, the polymer thus produced may be isolated from the reaction solution by a known method such as reprecipitation and removal of the solvent by distillation. In addition, the thus obtained polymer may be further subjected to reprecipitation, membrane separation, chromatography, extraction, etc., for removing unreacted monomers, etc., therefrom.

The water-insoluble polymer particles B are preferably used as such in the form of a water dispersion (emulsion) thereof in which the polymer particles are dispersed in a dispersing medium containing water as a main component, without removing the organic solvent used in the polymerization reaction therefrom from the viewpoint of well compounding the polymer particles in the water-based ink.

The solid content of the dispersion of the water-insoluble acrylic polymer particles is preferably not less than 30% by mass and more preferably not less than 40% by mass, and is also preferably not more than 60% by mass and more preferably not more than 50% by mass, from the viewpoint of well compounding the polymer particles together with the pigment-containing polymer particles A in the water-based ink.

(Weight-Average Molecular Weight of Acrylic Polymer)

The weight-average molecular weight of the acrylic polymer used in the present invention is preferably not less than 100,000, more preferably not less than 200,000 and even more preferably not less than 500,000, and is also preferably not more than 2,500,000 and more preferably not more than 1,000,000, from the viewpoint of improving adhesion to a substrate and enhancing an image quality of printed characters or images when printed on a non-water absorbing recording medium.

(Average Particle Size of Water-Insoluble Acrylic Polymer Particles)

In addition, the average particle size of the water-insoluble acrylic polymer particles in the dispersion or water-based ink containing the water-insoluble acrylic polymer particles is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the water-based ink and enhancing optical density of the ink when printed on a non-water absorbing recording medium.

Meanwhile, the average particle size of the water-insoluble acrylic polymer particles may be measured by the methods described in Examples below.

(Commercially Available Dispersion of Water-Insoluble Acrylic Polymer Particles)

Examples of the commercially available dispersion of the water-insoluble acrylic polymer particles include emulsions of acrylic resins such as "NeoCryl A1127" (anionic self-crosslinkable aqueous vinyl resin) available from DSM Coating Resins, Inc., and "JONCRYL 390" available from BASF Japan, Ltd., as well as emulsions of acrylic resins such as "JONCRYL 7100", "JONCRYL 734" and "JONCRYL 538" all available from BASF Japan, Ltd.; and emulsions of vinyl chloride-acrylic resins such as "VINYBLAN 701" available from Nissin Chemical Industry Co., Ltd., etc.

The water-insoluble acrylic polymer particles may be used in the form of a dispersion prepared by dispersing the water-insoluble acrylic polymer particles in water, and the dispersion of the water-insoluble acrylic polymer particles may also contain a dispersant such as a surfactant, if required. The water dispersion of the water-insoluble acrylic polymer particles also acts as a fixing emulsion for fixing droplets of the ink ejected from ink-jet nozzles on a recording medium to thereby obtain printed characters or images having excellent uniformity.

The content of the water-insoluble polymer particles B in the dispersion containing the water-insoluble acrylic polymer particles is preferably not less than 10% by mass, more preferably not less than 20% by mass and even more preferably not less than 30% by mass, and is also preferably not more than 70% by mass, more preferably not more than 60% by mass and even more preferably not more than 55% by mass, from the viewpoint of improving dispersion stability of the water-insoluble polymer particles B and attaining good convenience upon formulation of the ink.

[Water-Insoluble Polyester and Water-Insoluble Polyester Resin Particles]

The water-insoluble polyester used in the present invention (hereinafter also referred to merely as a "polyester") may be produced by subjecting at least an alcohol component and a carboxylic acid component to polycondensation.

(Alcohol Component)

The alcohol component as a raw material monomer of the polyester preferably includes an aromatic diol from the viewpoint of improving fixing properties of the water-based ink after drying. The aromatic diol is preferably an alkyleneoxide adduct of bisphenol A.

Meanwhile, the alkyleneoxide adduct of bisphenol A as used in the present invention means a whole structure of a compound formed by adding an oxyalkylene group to 2,2-bis(4-hydroxyphenyl)propane.

Specific examples of the preferred alkyleneoxide adduct of bisphenol A includes those compounds represented by the following general formula (I):

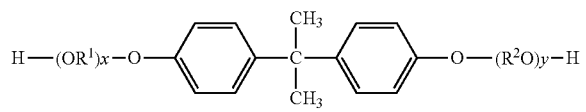

(I)

In the general formula (I), $OR^1$ and $R^2O$ are respectively an oxyalkylene group, preferably each independently an oxyalkylene group having not less than 1 and not more than 4 carbon atoms and more preferably an oxyethylene group or an oxypropylene group.

The suffixes x and y each correspond to a molar number of addition of the alkyleneoxide. In addition, from the viewpoint of attaining good reactivity with the carboxylic acid component, an average value of a sum of x and y is preferably not less than 2. From the same viewpoint as described above, the average value of a sum of x and y is also preferably not more than 7, more preferably not more than 5 and even more preferably not more than 3.

Furthermore, the $OR^1$ groups in the number of x and the $R^2O$ groups in the number of y may be respectively the same or different from each other. From the viewpoints of improving adhesion to a substrate, the $R^1O$ groups and the $R^2O$ groups are respectively preferably identical to each other. These alkyleneoxide adducts of bisphenol A may be used alone or in combination of any two or more thereof. Examples of the preferred alkyleneoxide adducts of bisphenol A include propyleneoxide adducts of bisphenol A and ethyleneoxide adducts of bisphenol A. Among these alkyleneoxide adducts of bisphenol A, more preferred are propyleneoxide adducts of bisphenol A.

The content of the alkyleneoxide adduct of bisphenol A in the alcohol component of the polyester is preferably not less than 50 mol %, more preferably not less than 60 mol % and even more preferably not less than 70 mol %, and the upper limit of the content of the alkyleneoxide adduct of bisphenol A in the alcohol component of the polyester is not more than 100 mol %, from the viewpoint of improving fixing properties of the resulting ink onto a recording medium.

The alcohol component as the raw material monomer of the polyester may also contain the following alcohol compounds in addition to the alkyleneoxide adduct of bisphenol A.

Specific examples of the alcohol component as the raw material monomer from which the constitutional unit of the polyester is derived (hereinafter also referred to merely as a "raw material monomer of the polyester resin") include ethylene glycol, propylene glycol (1,2-propanediol), glycerin, pentaerythritol, trimethylolpropane, hydrogenated bisphenol A, sorbitol and alkylene (having not less than 2 and not more than 4 carbon atoms) oxide adducts of these compounds (average molar number of addition of the alkyleneoxide: not less than 1 and not more than 16). These alcohol components may be used alone or in combination of any two or more thereof.

(Carboxylic Acid Component)

The carboxylic acid component as a raw material monomer of the polyester includes carboxylic acids as well as anhydrides and alkyl (having not less than 1 and not more than 3 carbon atoms) esters of these carboxylic acids, etc.

Examples of the preferred carboxylic acid component include aromatic dicarboxylic acids, aliphatic dicarboxylic acids, alicyclic dicarboxylic acids and trivalent or higher-valent polycarboxylic acids. Among these carboxylic acids, from the viewpoint of improving adhesion to a substrate as well as reactivity with the alcohol component, more preferred are aromatic dicarboxylic acids and aliphatic dicarboxylic acids, and even more preferred are aliphatic dicarboxylic acids.

Examples of the preferred aromatic dicarboxylic acids include phthalic acid, isophthalic acid and terephthalic acid. Of these aromatic dicarboxylic acids, more preferred is terephthalic acid.

As the aliphatic dicarboxylic acids, there may be mentioned unsaturated aliphatic dicarboxylic acids and saturated aliphatic dicarboxylic acids. Of these aliphatic dicarboxylic acids, from the viewpoint of improving adhesion to a substrate as well as reactivity with the alcohol component, preferred are unsaturated aliphatic dicarboxylic acids.

From the same viewpoint as described above, as the unsaturated aliphatic dicarboxylic acids, preferred are fumaric acid and maleic acid, and more preferred is fumaric acid.

Examples of the preferred saturated aliphatic dicarboxylic acids include adipic acid, succinic acid that may be substituted with an alkyl group an/or an alkenyl group.

Examples of the preferred alicyclic dicarboxylic acids include cyclohexanedicarboxylic acid, decalinedicarboxylic acid and tetrahydrophthalic acid.

Examples of the preferred trivalent or higher-valent polycarboxylic acids include trimellitic acid and pyromellitic acid.

These carboxylic acid components may be used alone or in combination of any two or more thereof.

(Production of Polyester)

The polyester may be produced by subjecting the aforementioned alcohol component and carboxylic acid component to polycondensation reaction. The suitable structures and suitable contents of the alcohol component and carboxylic acid component are the same as those described previously.

For example, the polyester may be produced by subjecting the aforementioned alcohol component and carboxylic acid component to polycondensation reaction in an inert gas atmosphere at a temperature of not lower than 180° C. and not higher than 250° C., if required, in the presence of an esterification catalyst.

From the viewpoint of well controlling a particle size of the polyester used in the form of particles, it is preferred that the polyester has a sharp molecular weight distribution, and the polycondensation for production of the polyester is carried out in the presence of the esterification catalyst. Examples of the esterification catalyst include tin catalysts, titanium catalysts and metal compounds such as antimony trioxide, zinc acetate and germanium dioxide. Among these esterification catalysts, from the viewpoint of improving reaction efficiency of the esterification reaction upon synthesis of the polyester, preferred are tin catalysts. Specific examples of the preferred tin catalysts include dibutyl tin oxide, tin (II) di(2-ethyl hexanoate) and salts of these compounds. Of these tin catalysts, tin (II) di(2-ethyl hexanoate) is more preferably used. Also, if required, an esterification co-catalyst such as gallic acid may be further used in the polycondensation reaction.

In addition, a radical polymerization inhibitor such as 4-tert-butyl catechol and hydroquinone may also be used in combination with the esterification catalyst or co-catalyst.

(Properties of Polyester)

From the viewpoint of improving adhesion to a substrate and enhancing an image quality of printed characters or images when printed on a non-water absorbing medium, the softening point of the polyester is preferably not lower than 80° C., more preferably not lower than 85° C. and even more preferably not lower than 90° C., and the upper limit of the softening point of the polyester is preferably not higher than 170° C., more preferably not higher than 145° C. and even more preferably not higher than 125° C.

From the same viewpoint as described above, the glass transition temperature (Tg) of the polyester is preferably not lower than 50° C. and more preferably not lower than 55° C., and the upper limit of the glass transition temperature of the polyester is preferably not higher than 95° C., more preferably not higher than 90° C., even more preferably not higher than 85° C. and further even more preferably not higher than 80° C.

From the viewpoint of well controlling a particle size of the resin particles and improving adhesion to a substrate, the acid value of the polyester is preferably not less than 5 mgKOH/g, more preferably not less than 15 mgKOH/g and even more preferably not less than 20 mgKOH/g, and the upper limit of the acid value of the polyester is preferably not more than 40 mgKOH/g, more preferably not more than 37 mgKOH/g and even more preferably not more than 35 mgKOH/g.

The glass transition temperature, softening point and acid value of the polyester may be respectively controlled to desired values by appropriately adjusting kinds and compounding ratios of the monomers used as well as the polycondensation reaction conditions such as the reaction temperature and the reaction time.

(Production of Polyester Resin Particles)

The polyester resin particles may be efficiently produced in the form of a water dispersion thereof by the process including the following steps (1') and (2').

Step (1'): subjecting a mixture containing the polyester, an organic solvent, a neutralizing agent and water to dispersion treatment to obtain a dispersion thereof and Step (2'): removing the aforementioned organic solvent from the dispersion obtained in the step (1') to obtain a water dispersion of the polyester resin particles.

The aforementioned steps (1') and (2') are the same as the steps (1) and (2) described with respect to production of the aforementioned pigment-containing polymer particles A previously, respectively, except that no pigment is used therein.

In the aforementioned process, the polyester, the organic solvent, the neutralizing agent and water are preferably added in the following order. That is, it is preferred that after previously mixing the polyester and the organic solvent, preferably dissolving the polyester in the organic solvent, the neutralizing gent is then added to the resulting mixture or solution, and while stirring the obtained reaction mixture, water is further added thereto. As the neutralizing agent, ammonia is preferably used.

When mixing the polyester, the organic solvent, the neutralizing agent and water, as the method of dispersing these components, there may be used the same dispersing method as used in the aforementioned process for producing the water dispersion of the pigment particles. However, the aforementioned respective components are preferably dispersed only by stirring.

The volume median particle size of the polyester resin particles obtained by the aforementioned production process is preferably not less than 5 nm and not more than 200 nm. When controlling the volume median particle size of the polyester resin particles to the aforementioned range, it is possible to obtain a water-based ink that is excellent in ejection properties of the ink upon ink-jet printing and fixing properties of printed characters or images of the ink on a recording medium. The volume median particle size of the polyester resin particles is more preferably not less than 10 nm, even more preferably not less than 50 nm and further even more preferably not less than 80 nm from the viewpoint of improving ejection properties of the ink, and is also more preferably not more than 150 nm, even more preferably not more than 130 nm and further even more preferably not more than 120 nm from the viewpoint of improving fixing properties of the ink.

The water-insoluble polyester resin particles may be used in the form of a dispersion prepared by dispersing the water-insoluble polyester resin particles in water, and the resulting dispersion of the water-insoluble polyester resin particles may also contain a dispersant such as a surfactant, if required. The water dispersion of the water-insoluble polyester resin particles also acts as a fixing emulsion for fixing droplets of the ink ejected from ink-jet nozzles on a recording medium to thereby obtain printed characters or images having excellent uniformity.

The content of the water-insoluble polymer particles B in the dispersion containing the water-insoluble polyester resin particles is preferably not less than 10% by mass, more preferably not less than 20% by mass and even more preferably not less than 30% by mass, and is also preferably not more than 70% by mass, more preferably not more than 60% by mass and even more preferably not more than 55% by mass, from the viewpoint of improving dispersion stability of the water-insoluble polymer particles B and attaining good convenience upon formulation of the ink.

[Water-Insoluble Polyurethane and Water-Insoluble Polyurethane Resin Particles]

The water-insoluble polyurethane used in the present invention (hereinafter also referred to merely as a "polyurethane") may be produced by subjecting an organic compound containing two or more active hydrogen atoms, a polyisocyanate and a dialkanol carboxylic acid to addition reaction to synthesize a polyurethane A, and then neutralizing a carboxy group contained in the thus synthesized polyurethane A with a neutralizing agent to disperse the polyurethane in water. More specifically, the polyurethane A may be synthesized by subjecting a polyol, a diisocyanate and a dialkanol carboxylic acid to addition reaction.

In the aforementioned addition reaction, a chain extender and a reaction terminator may also be used in combination with the aforementioned components, if required. In addition, the water-insoluble polyurethane may be produced by reacting the polyurethane A by a multiple-stage method to synthesize a urethane prepolymer, and then mixing the resulting urethane prepolymer with water while neutralizing the urethane prepolymer with a neutralizing agent to thereby subject the prepolymer to water extension reaction and simultaneously disperse the prepolymer in water. In this case, it is possible to facilitate control of a viscosity of the resulting polyurethane and removal of the solvent therefrom by distillation, so that suitable production of the polyurethane can be achieved. Thus, it is possible to obtain an emulsion of the polyurethane in the form of fine particles having an average particle size of 0.01 to 1 μm.

(Diisocyanate)

Examples of the diisocyanate include chain-like aliphatic isocyanates such as tetramethylene diisocyanate, 1,6-hexamethylene diisocyanate, dodecamethylene diisocyanate, trimethyl hexamethylene diisocyanate and lysine diisocyanate; aliphatic isocyanates having a cyclic structure such as 1,3-cyclohexylene diisocyanate, 1,4-cyclohexylene diisocyanate, hydrogenated xylylene diisocyanate, isophorone diisocyanate and 4,4'-dicyclohexylmethane diisocyanate; aromatic isocyanates such as tolylene diisocyanate, phenylene diisocyanate and diphenylmethane diisocyanate; and modified products of these diisocyanates (such as carbodiimide-, uretdione- and uretimine-containing modified products), etc. Among these diisocyanates, preferred are aliphatic diisocyanates.

(Polyol)

The polyol used in the present invention is not particularly limited as long as it contains two or more hydroxy groups in a molecule thereof. As the polyol, preferred are polycarbonate polyols, polyester polyols and polyether polyols, and more preferred are polycarbonate polyols.

Thus, the water-insoluble polyurethane is more preferably a polycarbonate-based polyurethane, and the water-insoluble polyurethane resin particles are more preferably polycarbonate-based polyurethane resin particles.

The polycarbonate polyol may be produced by reacting a carbonate compound with a diol.

Examples of the carbonate compound include dimethyl carbonate, diethyl carbonate, diphenyl carbonate, ethylene carbonate and diethylene carbonate.

Examples of the diol include aliphatic diols such as ethylene glycol, propylene glycol, diethylene glycol, 1,4-butanediol, 1,5-pentanediol, neopentyl glycol, 3-methyl-1, 5-pentanediol, 1,6-hexanediol, heptanediol, octanediol, nonanediol, decanediol and dodecanediol, which may be substituted with a lower alcohol; alicyclic diols such as cyclohexanediol and hydrogenated xylylene glycol; and aromatic diols such as xylylene glycol. Among these diols, preferred are aliphatic diols, and more preferred are aliphatic diols having a carbon chain length of 4 to 9, such as 1,4-butanediol, 3-methyl-1, 5-pentanediol, 1, 6-hexanediol, heptanediol, octanediol and nonanediol.

The polyester polyol may be produced by subjecting a low-molecular weight diol and a dicarboxylic acid to polycondensation reaction.

Examples of the low-molecular weight diol include ethylene glycol, diethylene glycol, propylene glycol, dipropylene glycol and 1,4-butanediol. Among these low-molecular weight diols, preferred are ethylene glycol, propylene glycol and 1,4-butanediol.

Examples of the dicarboxylic acid include aliphatic dibasic acids such as succinic acid, glutaric acid, adipic acid, pimelic acid, suberic acid, azelaic acid, sebacic acid and brassylic acid; and aromatic dibasic acids such as isophthalic acid, terephthalic acid and naphthalenedicarboxylic acid. Among these dicarboxylic acids, preferred are aliphatic dibasic acids, and more preferred are dibasic acids having a methylene chain length of 4 to 8, such as adipic acid, pimelic acid, suberic acid, azelaic acid and sebacic acid.

Examples of the polyether polyol include polymers obtained by subjecting a cyclic ether compound such as ethyleneoxide, propyleneoxide, butyleneoxide, styreneoxide, tetrahydrofuran and epichlorohydrin alone or in the form of a mixture of any two or more thereof to ring opening polymerization reaction using an active hydrogen atom-containing compound as a catalyst, etc. Specific examples of the polyether polyol include polyethylene glycol, polypropylene glycol and polytetramethylene glycol.

Examples of the solvent used in the reaction between the polyol and the diisocyanate include acetone, methyl ethyl ketone, tetrahydrofuran, dioxane, ethyl acetate, toluene and xylene. Among these solvents, from the viewpoint of obtaining the reaction product in the form of an emulsion, preferred are acetone, methyl ethyl ketone and ethyl acetate, etc.

The dialkanol carboxylic acid is a component for introducing an anionic hydrophilic group into the aforementioned polyurethane in order to stably disperse the polyurethane in water. Examples of the dialkanol carboxylic acid include dimethylol acetic acid and dimethylol propionic acid, etc. These carboxylic acids may be neutralized with a neutralizing agent to prepare a water dispersion thereof.

Examples of the neutralizing agent include alkyl amines such as butylamine and triethylamine; alkanol amines such as monoethanol amine, diethanol amine and triethanol amine; and inorganic bases such as morpholine, ammonia and sodium hydroxide.

The molecular weight of the reaction product of the polyol and the diisocyanate may be further increased using a conventionally known chain extender, if required. As the chain extender, there may be mentioned a polyol and a polyamine, etc. Also, as the reaction terminator, there may be mentioned a monoalcohol and a monoamine.

The acid value of the polyurethane is preferably not less than 5 mgKOH/g and more preferably not less than 10 mgKOH/g, and is also not more than 50 mgKOH/g, from the viewpoint of improving water dispersibility thereof.

The water-insoluble polyurethane resin particles may be used in the form of a dispersion prepared by dispersing the water-insoluble polyurethane resin particles in water, and the dispersion of the water-insoluble polyurethane resin particles may also contain a dispersant such as a surfactant, if required. The water dispersion of the water-insoluble polyurethane resin particles also acts as a fixing emulsion for fixing droplets of the ink ejected from ink-jet nozzles on a recording medium to thereby obtain printed characters or images having excellent uniformity.

The content of the water-insoluble polymer particles B in the dispersion containing the water-insoluble polyurethane resin particles is preferably not less than 10% by mass, more preferably not less than 20% by mass and even more preferably not less than 30% by mass, and is also preferably not more than 70% by mass, more preferably not more than 60% by mass and even more preferably not more than 55% by mass, from the viewpoint of improving dispersion stability of the water-insoluble polymer particles B and attaining good convenience upon formulation of the ink.

Examples of the commercially available products of the dispersion of the water-insoluble polyurethane resin particles used in the present invention include "NeoRez R-9603" available from DSM Coating Resins, Inc., etc.

[Content of Water-Insoluble Polymer Particles B, etc.]

The content (solid content) of the water-insoluble polymer particles B in the water-based ink is preferably not less than 1.0% by mass, more preferably not less than 1.6% by mass, even more preferably not less than 2.4% by mass, further even more preferably not less than 3.0% by mass and still further even more preferably not less than 3.5% by mass, and is also preferably not more than 7.0% by mass, more preferably not more than 6.5% by mass, even more preferably not more than 6.0% by mass and further even more preferably not more than 5.5% by mass, from the viewpoint of improving image quality of printed characters or images as well as adhesion to a substrate when printed on a non-water absorbing medium.

The mass ratio of the pigment to the water-insoluble polymer particles B [pigment/water-insoluble polymer particles B] is preferably not less than 0.3, more preferably not less than 0.5, even more preferably not less than 0.6 and further even more preferably not less than 0.7, and is also preferably not more than 4.0, more preferably not more than 3.0, even more preferably not more than 2.5 and further even more preferably not more than 2.0, from the viewpoint of improving image quality of printed characters or images and adhesion to a substrate when printed on a non-water absorbing medium as well as from the viewpoint of enhancing optical density of the resulting water-based ink.

<Organic Solvent C>

The organic solvent C contains at least one compound selected from the group consisting of diethylene glycol monobutyl ether and diethylene glycol monoisobutyl ether (hereinafter also referred to as an "alkylene glycol compound"), and propylene glycol, in which the total content of diethylene glycol monobutyl ether and diethylene glycol monoisobutyl ether in the water-based ink is not less than 0.8% by mass, and the content of an organic solvent having a boiling point of higher than 250° C. in the water-based ink is not more than 5% by mass.

In addition, the total content of at least one compound selected from the group consisting of diethylene glycol monobutyl ether and diethylene glycol monoisobutyl ether in the water-based ink is preferably not less than 3% by mass and more preferably not less than 5% by mass from the viewpoint of improving image quality of printed characters or images, and is also preferably not more than 20% by mass and more preferably not more than 10% by mass from the viewpoint of improving storage stability of the resulting water-based ink as well as image quality of printed characters or images. When the total content of at least one compound selected from the group consisting of diethylene glycol monobutyl ether and diethylene glycol monoisobutyl ether in the water-based ink is less than 0.8% by mass, the resulting ink tends to fail to exhibit sufficient wettability to a substrate, so that there tends to occur such a risk that the image quality is deteriorated, and white streaks are formed on the printed characters or images.

In addition, the organic solvent C further contains propylene glycol as an organic solvent other than the aforementioned alkylene glycol compound. In the case where the organic solvent C contained in the water-based ink is constituted of the alkylene glycol compound only, the resulting water-based ink tends to be hardly formed into droplets when ejected from a printer and therefore tends to cause formation of a mist or satellite droplets, so that there tends to occur such a problem that the water-based ink suffers from not only poor image quality, but also deterioration in storage stability. The content of propylene glycol in the water-based ink is preferably not less than 10% by mass, more preferably not less than 15% by mass, even more preferably not less than 25% by mass and further even more preferably not less than 28% by mass, and is also preferably not more than 38% by mass, more preferably not more than 35% by mass, even more preferably not more than 33% by mass and further even more preferably not more than 31% by mass.

The content of the organic solvent C in the water-based ink of the present invention is preferably not less than 40% by mass and more preferably not less than 50% by mass on the basis of a total amount of water and the organic solvent C from the viewpoint of improving wettability of the water-based ink to a recording medium, and is also preferably not more than 80% by mass and more preferably not more than 75% by mass on the basis of a total amount of water and the organic solvent C from the viewpoint of improving storage stability of the water-based ink.

The organic solvent C may further contain an organic solvent other than the aforementioned alkylene glycol compound and propylene glycol in combination therewith. The content of an organic solvent having a boiling point of higher than 250° C. in the water-based ink is not more than 5% by mass, preferably not more than 3% by mass and more preferably not more than 1% by mass, and even more preferably the water-based ink contains no organic solvent having a boiling point of higher than 250° C. When the content of the organic solvent having a boiling point of higher than 250° C. in the water-based ink becomes large, the organic solvent tends to remain between a substrate as a recording medium and printed characters or images of the ink and therefore tends to act as a releasing agent, so that the water-based ink tends to be deteriorated in adhesion to the substrate, water resistance and solvent resistance.

Specific examples of the organic solvent having a boiling point of higher than 250° C. include triethylene glycol monobutyl ether, glycerin, etc.

In addition, the organic solvent that may be used in combination with the alkylene glycol compound and propylene glycol is more preferably an organic solvent that is present in a liquid state at a temperature of 25° C. If an organic solvent that is present not in a liquid state but in a solid state at a temperature of 25° C. is used in the organic solvent C, the resulting water-based ink tends to exhibit high water retentivity when printed on the recording medium, so that water tends to be hardly removed by evaporation therefrom. As a result, the resulting printed material tends to become sticky, and the water-based ink tends to be considerably deteriorated in adhesion to a substrate, water resistance and solvent resistance.

Specific examples of the other organic solvent include aliphatic diols containing a hydroxy group bonded to a secondary carbon atom thereof and having not less than 2 and not more than 6 carbon atoms; glycol ethers such as ethylene glycol monoethyl ether, ethylene glycol monobutyl ether, diethylene glycol monomethyl ether, diethylene glycol monopropyl ether and diethylene glycol monoisopropyl ether; and γ-butyrolactone, etc. Of these organic solvents, from the viewpoint of improving rub fastness, solvent resistance and adhesion to a substrate when printed on a non-water absorbing medium, preferred are aliphatic diols containing a hydroxy group bonded to a secondary carbon atom thereof and having not less than 2 and not more than 6 carbon atoms and preferably not less than 3 and not more than 5 carbon atoms.

Among these aliphatic diols, more preferred is an aliphatic diol having 3 or 4 carbon atoms which is selected from the group consisting of 1,2-propanediol, 1,2-butanediol and 1,3-butanediol, and even more preferred is an aliphatic diol selected from the group consisting of 1,2-butanediol and 1,3-butanediol. Among these glycol ethers, more preferred is diethylene glycol monomethyl ether.

<Water>

As the water used in the water-based ink of the present invention, preferred are pure water and ultrapure water, such as ion-exchanged water and distilled water.

The content of water in the water-based ink is not less than 45% by mass, preferably not less than 48% by mass and more preferably not less than 50% by mass, and is also not more than 75% by mass, from the viewpoint of reducing an amount of the organic solvent used and improving ejection properties of the resulting water-based ink.

<Surfactant>

In the water-based ink of the present invention, from the viewpoint of improving image quality of printed characters or images and ejection stability of the water-based ink, it is preferred that a surfactant is added as a surface tension modifier thereto. Examples of the surfactant include a nonionic surfactant, a silicone-based surfactant and a fluorine-based surfactant. Among these surfactants, preferred is a nonionic surfactant.

The nonionic surfactant used in the present invention may be any nonionic surfactant that can be suitably used in the water-based ink. Examples of the nonionic surfactant include a polyoxyalkylene alkyl ether-type surfactant, an acetylene glycol-based surfactant, a polyhydric alcohol-type surfactant and an aliphatic acid alkanol amide. Among these nonionic surfactants, preferred are a polyoxyalkylene alkyl ether-type surfactant and an acetylene glycol-based surfactant, and more preferred are a surfactant in the form of an alkyleneoxide adduct of an alcohol having not less than 6 and not more than 30 carbon atoms and an acetylene glycol-based surfactant.

From the viewpoint of improving adhesion to a substrate, ejection stability and image density of the resulting ink when printed on a non-water absorbing recording medium, even more preferred is a combination of a surfactant in the form of an alkyleneoxide adduct of an alcohol having not less than 6 and not more than 30 carbon atoms and an acetylene glycol-based surfactant.

The number of carbon atoms of the alcohol in the alkyleneoxide adduct of the alcohol is preferably not less than 8, more preferably not less than 10 and even more preferably not less than 12, and is also preferably not more than 24, more preferably not more than 22 and even more preferably not more than 20.

From the same viewpoint as described above, as the alkyleneoxide adduct of the alcohol, preferred are an ethyleneoxide adduct of the alcohol and an ethyleneoxide/propyleneoxide adduct of the alcohol, and more preferred is an ethyleneoxide adduct of the alcohol, i.e., a polyoxyethylene alkyl ether.

The content of the surfactant in the water-based ink is preferably not less than 0.05% by mass, more preferably not less than 0.3% by mass and even more preferably not less than 0.5% by mass, and is also preferably not more than 3.0% by mass, more preferably not more than 1.5% by mass and even more preferably not more than 1.0% by mass.

The water-based ink of the present invention may be mixed, if required, with a pH controller such as amines, a mildew-proofing agent, an antiseptic agent, a chelating agent such as ethylenediamine tetraacetic acid, a rust-preventive agent and an antioxidant, etc., and may be used as a water-based ink for flexo printing, gravure printing or ink-jet printing, preferably as a water-based ink for ink-jet printing. In addition, for example, from the viewpoint of ensuring safety when using the ink in the applications such as printing on food packages, the water-based ink of the present invention preferably contains none of a radical initiator and/or a polymerizable monomer.

[Ink-Jet Printing Method]

The ink-jet printing method according to the present invention is not particularly limited as long as the water-based ink of the present invention is used therein, and is preferably carried out by the following method because the advantageous effects of the present invention can be further enhanced.

The ink-jet printing method according to the present invention includes the step of printing characters or images on a recording medium using the aforementioned water-based ink of the present invention, in which the recording medium has a water absorption of not less than 0 g/m$^2$ and not more than 2.5 g/m$^2$ as measured in a pure water contact time of 100 milliseconds.

The water absorption of the recording medium used in the ink-jet printing method according to the present invention as measured under the condition that a contact time between the recording medium and pure water is 100 milliseconds is not less than 0 g/m$^2$ and not more than 2.5 g/m$^2$. Examples of such a substrate as the recording medium include at least one material selected from the group consisting of a polyester film, a polyvinyl chloride film, a polypropylene film, a polyethylene film and a nylon film, etc. These films may be subjected to surface treatments such as corona treatment, etc., if required.

Examples of the generally available films include "LUMIRROR T60" (polyethylene terephthalate; thickness: 125 μm; water absorption: 2.3 g/m$^2$) available from Toray Industries Inc., "PVC8OB P" (polyvinyl chloride; water absorption: 1.4 g/m$^2$) available from Lintec Corp., "KINATH KEE 70CA" (polyethylene) available from Lintec Corp., "YUPO SG90 PAT1" (polypropylene) available from Lintec Corp., and "BONYL RX" (nylon) available from Kohjin Film & Chemical Co., Ltd.

Meanwhile, the aforementioned water absorption of the recording medium may be measured by the method described in Examples below.

The ink-jet printer suitably used in the ink-jet printing method of the present invention may be of either a thermal type or a piezoelectric type. In the present invention, a piezoelectric type ink-jet printer is preferably used for printing characters or images on a recording medium using the aforementioned water-based ink. In the piezoelectric printing method, the water-based ink hardly suffers from heating and evaporation upon printing, so that it is possible to print characters or images without any damage to the aforementioned properties of the water-based ink.

In the ink-jet printing method of the present invention, after heating the recording medium, the characters or images can be printed on the recording medium by an ink-jet recording method using the aforementioned water-based ink. The heating temperature of the recording medium is preferably not lower than 40° C. and more preferably not lower than 50° C. from the viewpoint of improving fixing properties of the water-based ink, and is also preferably not higher than 100° C., more preferably not higher than 80° C. and even more preferably not higher than 60° C. from the viewpoint of suppressing deterioration of the recording medium and saving energy consumed.

In addition, from the viewpoint of promoting drying of the ink after printing characters or images on a recording medium, the recording medium may be heated after printing the characters or images. The heating temperature of the recording medium with the printed characters or images is preferably not lower than 40° C. and more preferably not lower than 50° C. from the viewpoint of improving fixing properties of the water-based ink, and is also preferably not higher than 100° C., more preferably not higher than 80° C. and even more preferably not higher than 60° C. from the viewpoint of suppressing deterioration of the recording medium and saving energy consumed. The heating time of the recording medium is preferably not less than 10 seconds, more preferably not less than 60 seconds and even more preferably not less than 120 seconds from the viewpoint of improving drying of the ink on the recording medium, and is also preferably not more than 300 seconds and more preferably not more than 200 seconds from the viewpoint of suppressing deterioration of the recording medium and saving energy consumed.

With respect to the aforementioned embodiments, the present invention further provides the following aspects relating to the water-based ink and the ink-jet printing method.

<1> A water-based ink including pigment-containing water-insoluble polymer particles A, pigment-free water-insoluble polymer particles B, an organic solvent C and water, in which:
the pigment-containing water-insoluble polymer particles A are obtained by crosslinking pigment-containing water-insoluble polymer particles (a) in an aqueous medium;
the water-insoluble polymer particles B include at least one material selected from the group consisting of water-insoluble vinyl-based polymer particles, water-insoluble polyester resin particles and water-insoluble polyurethane resin particles;
the organic solvent C includes at least one compound selected from the group consisting of diethylene glycol monobutyl ether and diethylene glycol monoisobutyl ether, and propylene glycol, in which a total content of diethylene glycol monobutyl ether and diethylene glycol monoisobutyl ether in the water-based ink is not less than 0.8% by mass, and a content of an organic solvent having a boiling point of higher than 250° C. in the water-based ink is not more than 5% by mass; and
a content of water in the water-based ink is not less than 45% by mass.

<2> The water-based ink according to the aspect <1>, wherein the pigment-containing water-insoluble polymer particles A are obtained by crosslinking the pigment-containing water-insoluble polymer particles (a) with a compound containing two or more epoxy groups in a molecule thereof.

<3> The water-based ink according to the aspect <2>, wherein a water-insoluble polymer P1 constituting the pigment-containing water-insoluble polymer particles (a) is a vinyl-based polymer that is produced by copolymerizing a monomer mixture containing an ionic monomer (a) and a hydrophobic monomer (b), preferably a monomer mixture further containing a nonionic monomer (c) in addition to the components (a) and (b).

<4> The water-based ink according to the aspect <3>, wherein a content of the component (a) in the water-insoluble polymer P1 is preferably not less than 3% by mass, more preferably not less than 4% by mass and even more preferably not less than 5% by mass, and is also preferably not more than 40% by mass, more preferably not more than 30% by mass and even more preferably not more than 25% by mass.

<5> The water-based ink according to the aspect <3> or <4>, wherein a content of the component (b) in the water-insoluble polymer P1 is preferably not less than 5% by mass, more preferably not less than 10% by mass and even more preferably not less than 40% by mass, and is also preferably not more than 98% by mass, more preferably not more than 80% by mass and even more preferably not more than 70% by mass.

<6> The water-based ink according to any one of the aspects <3> to <5>, wherein a content of the component (c) in the water-insoluble polymer P1 is not less than 0% by mass, preferably not less than 2% by mass, more preferably not less than 4% by mass and even more preferably not less than 6% by mass, and is also preferably not more than 30% by mass, more preferably not more than 25% by mass and even more preferably not more than 20% by mass.

<7> The water-based ink according to any one of the aspects <2> to <6>, wherein an epoxy equivalent (g/eq) of the compound containing two or more epoxy groups in a molecule thereof is preferably not less than 90, more preferably not less than 100 and even more preferably not less than 110, and is also preferably not more than 1000, more preferably not more than 500 and even more preferably not more than 300.

<8> The water-based ink according to any one of the aspects <2> to <7>, wherein a molecular weight of the compound containing two or more epoxy groups in a molecule thereof is preferably not less than 120 and more preferably not less than 150, and is also preferably not more than 2000, more preferably not more than 1500 and even more preferably not more than 1000.

<9> The water-based ink according to any one of the aspects <2> to <8>, wherein the compound containing two or more epoxy groups in a molecule thereof is ethylene glycol diglycidyl ether and/or trimethylolpropane polyglycidyl ether.

<10> The water-based ink according to any one of the aspects <3> to <9>, wherein the compound containing two or more epoxy groups in a molecule thereof is used in such an amount that a weight ratio of the compound containing two or more epoxy groups in a molecule thereof as a crosslinking agent to the water-insoluble polymer P1 [crosslinking agent/water-insoluble polymer P1] is preferably from 0.3/100 to 50/100, more preferably from 1/100 to 40/100 and even more preferably from 3/100 to 25/100.

<11> The water-based ink according to any one of the aspects <3> to <10>, wherein the compound containing two or more epoxy groups in a molecule thereof is used in such an amount as to react with preferably not less than 0.1 mmol, more preferably not less than 0.3 mmol and even more preferably not less than 0.5 mmol of an ionic group of the water-insoluble polymer P1 in terms of an amount of the ionic group per 1 g of the water-insoluble polymer P1 constituting the pigment-containing water-insoluble polymer particles (a), and is also used in such an amount as to react with preferably not more than 20 mmol, more preferably not more than 15 mmol, even more preferably not more than 10 mmol, further even more preferably not more than 5 mmol and still further even more preferably not more than 1.0 mmol of the ionic group of the water-insoluble polymer P1 in terms of an amount of the ionic group per 1 g of the water-insoluble polymer P1.

<12> The water-based ink according to any one of the aspects <1> to <11>, wherein the pigment-containing polymer particles A obtained by the crosslinking treatment contain an ionic group neutralized with a base in an amount of not less than 0.3 mmol and preferably not less than 0.5 mmol, and also not more than 1.5 mmol, per 1 g of the polymer.

<13> The water-based ink according to any one of the aspects <1> to <12>, wherein a crosslinking rate of the pigment-containing water-insoluble polymer particles A is preferably not less than 10 mol %, more preferably not less than 20 mol % and even more preferably not less than 30 mol %, and is also preferably not more than 80 mol %, more preferably not more than 60 mol % and even more preferably not more than 50 mol %.

<14> The water-based ink according to any one of the aspects <1> to <13>, wherein an average particle size of the pigment-containing water-insoluble polymer particles A is preferably not less than 40 nm, more preferably not less than 50 nm and even more preferably not less than 60 nm, and is also preferably not more than 200 nm, more preferably not more than 150 nm and even more preferably not more than 100 nm.

<15> The water-based ink according to any one of the aspects <1> to <14>, wherein a glass transition temperature of a water-insoluble polymer P2 constituting the pigment-free water-insoluble polymer particles B is preferably not lower than 0° C., more preferably not lower than 5° C., even more preferably not lower than 30° C. and further even more preferably not lower than 50° C., and is also preferably not higher than 90° C., more preferably not higher than 85° C., even more preferably not higher than 80° C. and further even more preferably not higher than 75° C.

<16> The water-based ink according to the aspect <15>, wherein the water-insoluble polymer P2 constituting the pigment-free water-insoluble polymer particles B is an acrylic polymer.

<17> The water-based ink according to any one of the aspects <1> to <16>, wherein an average particle size of the pigment-free water-insoluble polymer particles B is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm.

<18> The water-based ink according to any one of the aspects <1> to <17>, wherein a content of propylene glycol in the water-based ink is preferably not less than 10% by mass, more preferably not less than 15% by mass and even more preferably not less than 25% by mass, and is also preferably not more than 38% by mass, more preferably not more than 35% by mass and even more preferably not more than 33% by mass.

<19> The water-based ink according to any one of the aspects <1> to <18>, wherein a content of the organic solvent having a boiling point of higher than 250° C. in the water-based ink is not more than 5% by mass, preferably not more than 3% by mass and more preferably not more than 1% by mass, and even more preferably the water-based ink contains no organic solvent having a boiling point of higher than 250° C.

<20> The water-based ink according to any one of the aspects <1> to <19>, wherein a content of the pigment in the water-based ink is preferably not less than 1% by mass, more preferably not less than 2% by mass and even more preferably not less than 3% by mass, and is also preferably not more than 25% by mass, more preferably not more than 10% by mass and even more preferably not more than 7% by mass.

<21> The water-based ink according to any one of the aspects <1> to <20>, wherein a content (solid content) of the pigment-containing water-insoluble polymer particles A in the water-based ink is preferably not less than 3.0% by mass, more preferably not less than 4.0% by mass and even more preferably not less than 6.0% by mass, and is also preferably not more than 30% by mass, more preferably not more than 20% by mass, even more preferably not more than 15% by mass and further even more preferably not more than 9.0% by mass.

<22> The water-based ink according to any one of the aspects <3> to <21>, wherein a content of the water-insoluble polymer P1 in the water-based ink is preferably not less than 1.0% by mass, more preferably not less than 2.0% by mass and even more preferably not less than 3.0% by mass, and is also preferably not more than 15% by mass, more preferably not more than 10% by mass and even more preferably not more than 5.0% by mass.

<23> The water-based ink according to any one of the aspects <1> to <22>, wherein a content of the water-insoluble polymer particles B in the water-based ink is preferably not less than 1.0% by mass, more preferably not less than 1.6% by mass, even more preferably not less than 2.4% by mass, further even more preferably not less than 3.0% by mass and still further even more preferably not less than 3.5% by mass, and is also preferably not more than 7.0% by mass, more preferably not more than 6.5% by mass, even more preferably not more than 6.0% by mass and further even more preferably not more than 5.5% by mass.

<24> The water-based ink according to any one of the aspects <1> to <23>, wherein a mass ratio of the pigment to the water-insoluble polymer particles B [pigment/water-insoluble polymer particles B] is preferably not less than 0.3, more preferably not less than 0.5, even more preferably not less than 0.6 and further even more preferably not less than 0.7, and is also preferably not more than 4.0, more preferably not more than 3.0, even more preferably not more than 2.5 and further even more preferably not more than 2.0.

<25> The water-based ink according to any one of the aspects <1> to <24>, wherein a content of the organic solvent C in the water-based ink is preferably not less than 40% by mass and more preferably not less than 50% by mass, and is also preferably not more than 80% by mass and more preferably not more than 75% by mass, on the basis of a total amount of water and the organic solvent C.

<26> The water-based ink according to any one of the aspects <1> to <25>, wherein a total content of at least one compound selected from the group consisting of diethylene glycol monobutyl ether and diethylene glycol monoisobutyl ether in the water-based ink is preferably not less than 3% by mass and more preferably not less than 5% by mass, and is also preferably not more than 20% by mass and more preferably not more than 10% by mass.

<27> The water-based ink according to any one of the aspects <1> to <26>, wherein a content of water in the water-based ink is not less than 45% by mass, preferably not less than 48% by mass and more preferably not less than 50% by mass, and is also not more than 75% by mass.

<28> The water-based ink according to any one of the aspects <1> to <27>, further including a nonionic surfactant, preferably a polyoxyalkylene alkyl ether-type surfactant or an acetylene glycol-based surfactant, and more preferably a surfactant in the form of an alkyleneoxide adduct of an alcohol having not less than 6 and not more than 30 carbon atoms or an acetylene glycol-based surfactant.

<29> The water-based ink according to any one of the aspects <1> to <28>, wherein the water-based ink includes none of a radical initiator and/or a polymerizable monomer.

<30> The water-based ink according to any one of the aspects <1> to <29>, wherein the water-based ink is used for ink-jet printing.

<31> A use of the water-based ink according to any one of the aspects <1> to <29>, as a water-based ink for ink-jet printing.

<32> An ink-jet printing method including the step of printing characters or images on a recording medium using a water-based ink, in which:

the water-based ink includes pigment-containing water-insoluble polymer particles A, pigment-free water-insoluble polymer particles B, an organic solvent C and water;

the pigment-containing water-insoluble polymer particles A is obtained by crosslinking pigment-containing water-insoluble polymer particles (a) in an aqueous medium;

the water-insoluble polymer particles B are in the form of vinyl-based polymer particles;

the organic solvent C includes at least one compound selected from the group consisting of diethylene glycol monobutyl ether and diethylene glycol monoisobutyl ether, and propylene glycol, in which a total content of diethylene glycol monobutyl ether and diethylene glycol monoisobutyl ether in the water-based ink is not less than 3% by mass, and a content of an organic solvent having a boiling point of higher than 250° C. in the water-based ink is not more than 5% by mass;

a content of water in the water-based ink is not less than 45% by mass; and a water absorption of the recording medium is not less than 0 g/m$^2$ and not more than 2.5 g/m$^2$ as measured in a pure water contact time of 100 milliseconds.

<33> The ink-jet printing method according to the aspect <32>, wherein the recording medium is at least one material selected from the group consisting of a polyester film, a polyvinyl chloride film, a polypropylene film, a polyethylene film and a nylon film, etc.

<34> The ink-jet printing method according to the aspect <32> or <33>, wherein after heating the recording medium, character or images are printed on the recording medium by an ink-jet recording method using the water-based ink, and a heating temperature of the recording medium is preferably not lower than 40° C. and more preferably not lower than 50° C., and is also preferably not higher than 100° C., more preferably not higher than 80° C. and even more preferably not higher than 60° C.

<35> The ink-jet printing method according to any one of the aspect <32> to <34>, wherein after printing the characters or images on the recording medium, the recording medium with the printed characters or images is heated, and a heating temperature of the recording medium with the printed characters or images is preferably not lower than 40° C. and more preferably not lower than 50° C., and is also preferably not higher than 100° C., more preferably not higher than 80° C. and even more preferably not higher than 60° C.

<36> The ink-jet printing method according to the aspect <35>, wherein a heating time of the recording medium with the printed characters or images is preferably not less than 10 seconds, more preferably not less than 60 seconds and even more preferably not less than 120 seconds, and is also preferably not more than 300 seconds and more preferably not more than 200 seconds.

EXAMPLES

In the following Production Examples, Examples and Comparative Examples, the "part(s)" and "%" indicate "part(s) by mass" and "% by mass", respectively, unless otherwise specified. Meanwhile, various properties were measured and evaluated by the following methods.

(1) Measurement of Weight-Average Molecular Weight of Water-Insoluble Polymer P1

The weight-average molecular weight of the water-insoluble polymer P1 was measured by gel chromatography [GPC apparatus: "HLC-8120GPC" available from Tosoh Corp.; columns: "TSK-GEL, α-M" x 2 available from Tosoh Corp.; flow rate: 1 mL/min)] using N,N-dimethyl formamide in which phosphoric acid and lithium bromide were dissolved in amounts of 60 mmol/L and 50 mmol/L, respectively, as an eluent, and using a monodisperse polystyrene having a previously known molecular weight as a reference standard substance.

(2) Measurement of Solid Content of Pigment Water Dispersion

Ten grams (10.0 g) of sodium sulfate dried to constant weight in a desiccator were weighed and charged in a 30 mL polypropylene reaction vessel (φ: 40 mm; height: 30 mm), and about 1.0 g of a sample to be measured was added to the reaction vessel. The contents of the reaction vessel were mixed and then accurately weighed. The resulting mixture was maintained in the reaction vessel at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(3) Measurement of Average Particle Sizes of Pigment-Containing Water-Insoluble Polymer Particles A and Pigment-Free Water-Insoluble Polymer Particles B The average particle size was measured by cumulant analysis using a laser particle analyzing system "ELS-8000" available from Otsuka Electrics Co., Ltd. The measurement was conducted at a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting the concentration of the dispersion to be measured to $5 \times 10^{-3}$% by mass in terms of the solid content thereof.

(4) Measurement of Epoxy Equivalent of Crosslinking Agent

The epoxy equivalent of the crosslinking agent was measured by a potentiometric titration method using a potentiometric automatic titration device "AT-610" available from Kyoto Electronics Manufacturing Co., Ltd., according to JIS K 7236.

(5) Acid Value of Resin

The acid value of the resin was measured by the same method as prescribed in JIS K 0070 except that a mixed solvent of ethanol and ether used in the method was replaced with a mixed solvent containing acetone and toluene at a volume ratio [acetone: toluene] of 1:1.

(6) Softening Point of Resin

Using a flow tester "CFT-500D" available from Shimadzu Corporation, 1 g of a resin as a sample to be measured was extruded through a nozzle having a die pore diameter of 1 mm and a length of 1 mm while heating the sample at a temperature rise rate of 6° C./minute and applying a load of 1.96 MPa thereto by a plunger. The softening point of the resin was determined as the temperature at which a half amount of the sample was flowed out when plotting a downward movement of the plunger of the flow tester relative to the temperature.

(7) Glass Transition Temperature of Resin

Using a differential scanning calorimeter "Pyris 6 DSC" (tradename) commercially available from PerkinElmer Co., Ltd., a resin as a sample to be measured was heated to 200° C. and then cooled from 200° C. to 0° C. at a temperature drop rate of 10° C./min, and thereafter heated again at a temperature rise rate of 10° C./min to prepare an endothermic characteristic curve thereof. The temperature at which an extension of a baseline below an endothermic maximum peak temperature on the curve was intersected with a tangential line having a maximum inclination of the curve in the range of from a rise-up potion to an apex of the peak was read as a glass transition point of the sample.

Meanwhile, in the case were the sample was in the form of resin particles dispersed in an aqueous dispersion of the resin particles, the aqueous dispersion was freeze-dried at −10° C. for 9 hours using a freeze dryer "FDU-2100" available from Tokyo Rikakikai Co., Ltd., and the thus obtained freeze-dried product was used as the sample.

(8) Water Absorption of Recording Medium as Measured in Pure Water Contact Time of 100 Milliseconds Using an automatic scanning liquid absorptiometer "KM500win" available from Kumagai Riki Kogyo Co., Ltd., the amount of pure water transferred to a recording medium when contacting the recording medium with pure water for 100 milliseconds was measured at a temperature of 23° C. and a relative humidity of 50%. The thus measured amount of pure water transferred to the recording medium was determined as a water absorption of the recording medium as measured in a pure water contact time of 100 milliseconds. The measuring conditions are as follows.

"Spiral Method"
Contact time: 0.010-1.0 (sec)
Pitch (mm): 7
Length Per Sampling (degree): 86.29
Start Radius (mm): 20; End Radius (mm): 60
Min Contact Time (ms): 10; Max Contact Time (ms): 1000
Sampling Pattern (1-50): 50
Number of Sampling Points (>0): 19
"Square Head"
Slit Span (mm): 1; Slit Width (mm): 5

The details of the pigment, the water dispersion of the water-insoluble polymer particles B, the organic solvent C and the surfactant used in the following Production Example, Preparation Examples, Examples and Comparative Examples are as follows.

[Pigment]
Copper phthalocyanine pigment "FASTOGEN BLUE TGR-SD" available from DIC Corporation

[Water Dispersion of Water-Insoluble Polymer Particles B]
<Dispersion of Water-Insoluble Vinyl-Based Polymer Particles>
B-1: Water-insoluble acrylic emulsion "VINYBLAN 701" (vinyl chloride-acrylic resin emulsion; solid content: 30.0%) available from Nissin Chemical Industry Co., Ltd.; average particle size: 57.2 nm
B-2: Water-insoluble acrylic resin emulsion "NeoCryl A-1127" (solid content: 44.0%) available from DSM Coating Resins, B.V.; average particle size: 63.0 nm
<Dispersion of Polyester Resin Particles>
B-3: Water-insoluble polyester resin emulsion obtained by the following method:
A 10 L-capacity four-necked flask equipped with a thermometer, a stirrer, a falling type condenser and a nitrogen inlet tube was charged with 3718 g of a polyoxypropylene (2.2) adduct of bisphenol A, 1282 g of fumaric acid, 25 g of tin di(2-ethyl hexanoate) as an esterification catalyst and 0.25 g of gallic acid as an esterification co-catalyst. The contents of the flask were reacted at 210° C. for 10 hours in a mantle heater in a nitrogen atmosphere, thereby obtaining a polyester resin.

The thus obtained polyester resin had a softening point of 100.9° C., a glass transition temperature of 58.5° C. and an acid value of 22.4 mgKOH/g.

Two hundred grams (200 g) of the obtained polyester resin were dissolved in 200 g of methyl ethyl ketone (MEK), and then 3.26 g of a 25% ammonia aqueous solution as a neutralizing agent and 467 g of ion-exchanged water were added to the resulting solution. The obtained mixed solution was stirred and mixed at a temperature of not lower than 10° C. and not higher than 15° C. using a disper blade at a rotating speed of 2000 rpm for 15 minutes, thereby obtaining a dispersion of polyester resin particles (solid content: 40%).

<Dispersion of Polyurethane Resin Particles>
B-4: Water-insoluble polyurethane resin emulsion "NeoRez R-9603" (solid content: 34%; acid value: 32 mgKOH/g) available from DSM Coating Resins, Inc.; average particle size: 34.7 nm

[Dispersion of Water-Soluble Resin Particles]
BX1: Water-soluble styrene-acrylic acid polymer emulsion "JONCRYL 690" (solid content: 20%; weight-average molecular weight: 16500; acid value: 240 mgKOH/g) available from BASF Japan, Ltd.
BX2: Water-soluble urethane-based resin emulsion "ACRIT WBR-016U" (solid content: 30.0%) available from Taisei Fine Chemical Co., Ltd.; average particle size: 19.7 nm

[Organic Solvent C]
BDG: Diethylene glycol monobutyl ether; boiling point: 230° C.
iBDG: Diethylene glycol monoisobutyl ether; boiling point: 220° C.
Propylene glycol; boiling point: 187° C.
1,2-Butanediol; boiling point: 190° C.
1,3-Butanediol; boiling point: 207° C.
MDG: Diethylene glycol monomethyl ether; boiling point: 194° C.
BTG: Triethylene glycol monobutyl ether; boiling point: 304° C.
Glycerin; boiling point: 290° C.; available from Kao Corporation Meanwhile, the organic solvents other than glycerin are products available from Wako Pure Chemical Industries, Ltd.

[Surfactant]
A: "EMULGEN 120" (polyoxyethylene lauryl ether) available from Kao Corporation; nonionic surfactant
B: "SURFYNOL 104PG-50" (propylene glycol (50%) solution of an acetylene glycol-based surfactant) available from Kawaken Fine Chemicals Co., Ltd.; nonionic surfactant Production Example 1

Production of Solution of Water-Insoluble Polymer P1

The monomers, the organic solvent (methyl ethyl ketone) and the chain transfer agent (2-mercaptoethanol) as shown in the column "Initially Charged Monomer Solution" in Table 1 were charged into a reaction vessel equipped with two dropping funnels 1 and 2 and mixed with each other, and an inside atmosphere of the reaction vessel was replaced with a nitrogen gas, thereby obtaining an "initially charged monomer solution".

On the other hand, the monomers, the organic solvent, the polymerization initiator "V-65" (tradename) (2,2'-azobis(2, 4-dimethylvaleronitrile) available from Wako Pure Chemical Industries, Ltd., and the aforementioned chain transfer agent as shown in the column "Dropping Monomer Solution 1" in Table 1 were mixed with each other. The resulting dropping monomer solution 1 was charged into the dropping funnel 1, and an inside atmosphere of the dropping funnel 1 was replaced with a nitrogen gas.

In addition, the monomers, the organic solvent, the aforementioned polymerization initiator and the aforementioned chain transfer agent as shown in the column "Dropping Monomer Solution 2" in Table 1 were mixed with each other. The resulting dropping monomer solution 2 was charged into the dropping funnel 2, and an inside atmosphere of the dropping funnel 2 was replaced with a nitrogen gas.

In a nitrogen atmosphere, the "initially charged monomer solution" in the reaction vessel was maintained at 77° C. while stirring, and the "dropping monomer solution 1" in the dropping funnel 1 was gradually added dropwise to the reaction vessel over 3 hours. Next, the "dropping monomer solution 2" in the dropping funnel 2 was gradually added dropwise to the reaction vessel over 2 hours. After completion of the dropwise addition of the dropping monomer solutions 1 and 2, the resulting mixed solution in the reaction vessel was stirred at 77° C. for 0.5 hour. Then, a polymerization initiator solution prepared by dissolving 0.6 part of the aforementioned polymerization initiator in 27.0 parts of methyl ethyl ketone was added to the mixed solution, and the resulting reaction solution was aged at 77° C. for 1 hour while stirring.

The aforementioned procedure including the preparation and addition of the polymerization initiator solution and the aging of the reaction solution was repeated five more times. Then, after maintaining the reaction solution in the reaction vessel at 80° C. for 1 hour, methyl ethyl ketone was added thereto, thereby obtaining a solution of a water-insoluble polymer P1 (solid content: 40.8%). The weight-average molecular weights of the thus obtained water-insoluble polymer P1 was 52,700.

neutralization of the water-insoluble polymer by sodium hydroxide was adjusted to 78.8% and the degree of neutralization of the water-insoluble polymer by ammonia was adjusted to 21.2%. The resulting reaction solution was stirred at 1400 rpm for 15 minutes while cooling the solution in a water bath at 0° C. Then, 150 g of a cyan pigment "PB 15:3" (copper phthalocyanine) available from DIC Corp., was added to the reaction solution, and the resulting mixture was stirred at 7000 rpm for 3 hours, followed by adding 199.8 g of ion-exchanged water thereto. The thus obtained pigment mixture was subjected to dispersion treatment under a pressure of 150 MPa by passing through a Microfluidizer "M-110EH-30XP" available from Microfluidics Corporation 20 times, thereby obtaining a dispersion treatment product (solid content: 21.0% by mass).

(2) Step 2:

A 2 L egg plant-shaped flask was charged with 1000 g of the dispersion treatment product obtained in the above step 1, and then 400 g of ion-exchanged water was added thereto, and the resulting dispersion (solid content: 15.0% by mass) was maintained under a pressure of 0.09 MPa in a warm water bath adjusted at 32° C. for 3 hours using a rotary distillation apparatus "Rotary Evaporator N-1000S" available from Tokyo Rikakikai Co., Ltd., operated at a rotating speed of 50 rpm to thereby remove the organic solvent therefrom. Furthermore, the temperature of the warm water bath was adjusted to 62° C., and the pressure was reduced to 0.07 MPa, and the reaction solution was concentrated under this condition until a solid content of the reaction solution was increased to 25.0% by mass.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 minutes. Thereafter, the resulting liquid layer portion was subjected to filtration through a 5 μm-mesh membrane filter "Minisart" available from Sartorius Inc., thereby obtaining a pigment dispersion (a).

TABLE 1

|  |  | Initially charged monomer solution (part(s)) | Dropping monomer solution 1 (part(s)) | Dropping monomer solution 2 (part(s)) |
|---|---|---|---|---|
| (a) Ionic monomer | Methacrylic acid | — | 76.8 | 19.2 |
| (b) Hydrophobic monomer | Styrene | 26.4 | 211.2 | 26.4 |
|  | Styrene-based macromer | 18.0 | 162.0 | — |
| (c) Nonionic monomer | M-40G | 15.0 | 120.0 | 15.0 |
| Organic solvent | Methyl ethyl ketone | 10.5 | 115.5 | 84.0 |
| Polymerization initiator | V-65 | — | 4.8 | 1.2 |
| Chain transfer agent | 2-Mercaptoethanol | 0.08 | 0.59 | 0.17 |

Preparation Example 1

Preparation of Pigment Dispersion A-1C (1) Step 1:

The water-insoluble polymer (a) solution (solid content: 40.8%) obtained in Production Example 1 was weighed in an amount of 157.6 g and mixed with 60.7 g of methyl ethyl ketone (MEK), thereby obtaining an MEK solution of the water-insoluble polymer (a). The resulting MEK solution of the water-insoluble polymer (a) was charged into a 2 L-capacity disper, and while stirring the solution at 1400 rpm, 446.9 g of ion-exchanged water, 22.3 g of a 5N sodium hydroxide aqueous solution and 1.7 g of a 25% ammonia aqueous solution were added thereto such that the degree of (3) Step 3:

Ion-exchanged water in an amount of 54.6 g was added to 400 g of the pigment dispersion (a) obtained in the step 2 (copper phthalocyanine: 68.6 g; water-insoluble polymer (a): 29.4 g). In addition, 0.89 g of "Proxel LVS" (mildew-proofing agent; active ingredient content: 20%) available from Arch Chemicals Japan, Inc., and 2.82 g of an epoxy crosslinking agent "DENACOL EX321L" (tradename; trimethylolpropane polyglycidyl ether; epoxy equivalent: 129; being used in such an amount that a crosslinking rate of the polymer was 40 mol %) available from Nagase ChemteX Corp., were added to the obtained dispersion, followed by stirring the resulting mixture at 70° C. for 2 hours. The obtained mixture was cooled to 25° C. and then subjected to filtration through the aforementioned 5 μm-mesh filter, and further ion-exchanged water was added to the resulting dispersion such that the solid content of the dispersion was reduced to 22.0% by mass, thereby obtaining a pigment dispersion A-1C (crosslinking rate: 40 mol %). The average particle size of the pigment-containing water-insoluble polymer particles A-1C contained in the resulting pigment dispersion was 93.1 nm.

Preparation Example 2

Preparation of Pigment Dispersion A-2C

Ion-exchanged water in an amount of 49.6 g was added to 400 g of the pigment dispersion (a) obtained in in the step 2 of Preparation Example 1 (copper phthalocyanine: 68.6 g; water-insoluble polymer (a): 29.4 g). In addition, 0.89 g of "Proxel LVS" (mildew-proof agent; active ingredient content: 20%) available from Arch Chemicals Japan, Inc., and 1.41 g of an epoxy crosslinking agent "DENACOL EX321L" (tradename; trimethylolpropane polyglycidyl ether; epoxy equivalent: 129; being used in such an amount that a crosslinking rate of the polymer was 20 mol %) available from Nagase ChemteX Corp., were added to the obtained dispersion, followed by stirring the resulting mixture at 70° C. for 2 hours. The obtained mixture was cooled to 25° C. and then subjected to filtration through the aforementioned 5 μm-mesh filter, and ion-exchanged water was further added to the resulting dispersion such that the solid content of the dispersion was reduced to 22.0% by mass, thereby obtaining a pigment dispersion A-2C (crosslinking rate: 20 mol %). The average particle size of the pigment-containing water-insoluble polymer particles A-2C contained in the resulting pigment dispersion was 92.5 nm.

Preparation Examples 3 to 7

Preparation of Pigment Dispersions A-3M, A-4M, A-5Y, A-6Y and A-7B)

The same procedure as in Preparation Example 1 was repeated except that the pigment used in Preparation Example 1 was replaced with two kinds of a magenta pigment, "PR122" available from Dainichiseika Color & Chemicals Mfg. Co., Ltd., and "PR150" available from Fuji Pigment Co., Ltd., two kinds of a yellow pigment "PY74" available from Sanyo Color Works, Ltd., and a yellow "PY155" available from Clariant, and a black pigment "PB7" available from Cabot Corporation, respectively, thereby obtaining pigment dispersions A-3M and A-4M (magenta pigment dispersions), pigment dispersions A-5Y and A-6Y (yellow pigment dispersions) and a pigment dispersion A-7B (black pigment dispersion).

Preparation Example 8

Preparation of Pigment Dispersion AX

Ion-exchanged water in an amount of 44.6 g was added to 400 g of the pigment dispersion (a) obtained in the step 2 of Preparation Example 1 (copper phthalocyanine: 68.6 g; water-insoluble polymer (a): 29.4 g). In addition, 0.89 g of "Proxel LVS" (mildew-proof agent; active ingredient content: 20%) available from Arch Chemicals Japan, Inc., was added to the obtained dispersion, followed by stirring the resulting mixture at 70° C. for 2 hours. The obtained mixture was cooled to 25° C. and then subjected to filtration through the aforementioned 5 μm-mesh filter, and ion-exchanged water was further added to the resulting dispersion such that the solid content of the dispersion was reduced to 22.0% by mass, thereby obtaining a pigment dispersion AX (non-crosslinked coloring material). The average particle size of the pigment-containing water-insoluble polymer particles X contained in the resulting pigment dispersion was 91.7 nm.

Example 1

(1) Production of Water-Based Ink 1

Twenty six grams (26.0 g) of the pigment dispersion A-1C obtained in Preparation Example 1 (pigment: 4.00 g; resin: 1.71 g) were added and mixed with 13.3 g of the water-insoluble acrylic emulsion B-1 "VINYBLAN 701" (resin: 4.00 g; water: 9.33 g), 30 g of propylene glycol, 5 g of diethylene glycol monobutyl ether (BDG), 0.5 g of "EMULGEN 120", 0.5 g of "SURFYNOL 104PG50" and 24.7 of ion-exchanged water. The resulting mixed solution was filtered by passing through a 1.2 μm-mesh membrane filter "Minisart" (tradename) available from Sartorius Inc., thereby obtaining a water-based ink 1.

(2) Evaluation of Water-Based Ink 1

The water-based ink 1 obtained in the above item (1) was charged into an ink-jet printer "IPSIO SG 2010L" equipped with a rubber heater available from Ricoh Company, Ltd., and solid image printing was conducted on a polyethylene terephthalate film "LUMIRROR T60" (water absorption: 2.3 g/m$^2$) available from Toray Industries Inc., a polyvinyl chloride film "PVC8OB P" (water absorption: 1.4 g/m$^2$) available from Lintec Corporation and an antifogging polypropylene film "AF-662" (water absorption: 2.4 g/m$^2$) available from Futamura Chemical Co, Ltd., respectively, which were previously heated to 60° C., and the resulting printed materials with the solid image were placed on a hot plate heated to 60° C. and dried thereon for 6 minutes, thereby final printed materials.

The thus obtained water-based ink and printed materials were evaluated by the following methods.

Examples 2 to 21 and Comparative Examples 1 to 15

(1) Production of Water-Based Inks 2 to 36

According to the formulations shown in Tables 2 and 3, the obtained pigment dispersion (A-1C to A-7B and AX), the water-insoluble polymer particles B or a dispersion of the water-soluble polymer particles, the organic solvent, the surfactant and ion-exchanged water, etc., were mixed with each other. The resulting mixed solution was filtered by passing through the aforementioned 1.2 μm-mesh membrane filter, thereby obtaining water-based inks 2 to 36.

(2) Evaluation of Water-Based Inks 2 to 36

The subsequent procedure was conducted in the same manner as in Example 1 except that the water-based ink 1 obtained in Example 1(1) was replaced with the water-based inks 2 to 36 obtained in the above item (1), respectively, thereby obtaining respective printed materials.

The thus obtained water-based inks and printed materials were evaluated by the following methods.

<Storage Stability>

The water-based ink was stored at an ambient temperature of 60° C. for 28 days. Before and after the storage, the water-based ink was subjected to the measurement for a rate of change in cumulant average particle size of particles in the pigment dispersion (average particle size after storage/ average particle size before storage) using a particle size measuring device "ELSZ-2000S" available from Otsuka Electrics Co., Ltd.

In addition, using an E-type viscometer available from Toki Sangyo Co., Ltd., the viscosity at 25° C. of the water-based ink was measured before and after the storage to evaluate a rate of change in viscosity of the ink (viscosity of ink after storage/viscosity of ink before storage).

On the basis of the obtained results, the storage stability of the water-based ink was evaluated according to the following evaluation ratings.
(Evaluation Ratings)

A: The rate of change in average particle size of particles in the water-based ink fell within the range of ±5%, and the rate of change in viscosity of the ink fell within the range of ±5%.

A–: The rate of change in average particle size of particles in the water-based ink fell within the range of ±10%, and the rate of change in viscosity of the ink fell within the range of ±10%.

B: The rate of change in average particle size of particles in the water-based ink fell within the range of ±15%, and the rate of change in viscosity of the ink fell within the range of ±15%.

C: The rate of change in average particle size of particles in the water-based ink fell within the range of ±20%, and the rate of change in viscosity of the ink fell within the range of ±20%.

D: The rate of change in average particle size of particles in the water-based ink was not less than +20% or not more than –20%, or the rate of change in viscosity of the ink was not less than +20% or not more than –20%.

The evaluation rating A or A– shows that the water-based ink had sufficient storage stability.
<Ejection Stability>

After filling the ink in an ink cartridge of an ink-jet printer "IPSIO SG 2010L" available from Ricoh Company, Ltd., a print head of the ink-jet printer was allowed to stand in an uncapped state for 30 minutes, and then the printing operation of the ink-jet printer was started again to confirm an ejection condition of the ink and evaluate ejection stability of the ink according to the following evaluation ratings. The total number of nozzles evaluated for ejection stability of the ink was 96.
(Evaluation Ratings)

A+: No nozzle lack was observed.

A: The proportion of nozzles suffering from any nozzle lack to whole nozzles was not more than 2/48.

B: The proportion of nozzles suffering from any nozzle lack to whole nozzles was more than 2/48 but not more than 5/48.

C: The proportion of nozzles suffering from any nozzle lack to whole nozzles was more than 5/48, but the nozzle lack was mendable and restorable by maintenance.

D: Nozzle lack was not mendable by maintenance.

The evaluation rating A+, A or B shows that the water-based ink exhibited substantially sufficient ejection stability upon practical use.
<Image Quality>

The final printed materials obtained on the polyvinyl chloride film, the polypropylene film and the polyethylene terephthalate film were respectively observed by naked eyes to evaluate an image quality thereof according to the following evaluation ratings.
(Evaluation Ratings)

A: None of bleeding, mottling (unevenness) and white streaks was observed.

A–: Bleeding, mottling (unevenness) or white streaks were slightly recognized when observed by a magnifying glass, but were invisible by naked eyes.

B: Bleeding, mottling (unevenness) or white streaks were observed by naked eyes, but were invisible by naked eyes at the position spaced apart by 2 m or more from the printed materials.

C: Bleeding, mottling (unevenness) or white streaks were recognized at a glance even at the position spaced apart by 2 m or more from the printed materials.

D: Poor wetting, severe bleeding or feathering was apparently recognized, and severe mottling (unevenness) and undesirable local contrast (difference in image density between local positions) were also clearly formed, so that the obtained printed materials failed to provide adequate printed matters.

The evaluation rating A, A– or B shows that the water-based ink had good image quality upon practical use.
<Rub Fastness>

The final printed materials obtained on the polyvinyl chloride film, the polypropylene film and the polyethylene terephthalate film were respectively rubbed with a commercially available eraser by moving the eraser by 10 reciprocative motions over the printed surface thereof while applying a load of 1 kg to the eraser. Then, the thus rubbed printed surface of the respective printed materials was observed by naked eyes to examine the surface condition thereof and evaluate rub fastness of the water-based ink according to the following evaluation ratings.
(Evaluation Ratings)

A+: Any change was not recognized at all when observed by naked eyes.

A: No peeling of the ink at the tested portion was observed, but change in color was recognized.

A–: Peeling of the ink was observed in some places in a region of not more than 1/10 of the tested portion.

B+: Peeling of the ink was observed in some places in a region of not more than 1/4 of the tested portion.

B: Peeling of the ink was observed in some places in a region of not more than 1/2 of the tested portion.

B–: Peeled portion of the ink was observed in some places in a region of not more than 3/4 of the tested portion.

C: Peeled portion of the ink was spread over a whole region of the tested portion, but the area of the ink-peeled portion was smaller than the area of the ink-non-peeled portion.

D: The area of the ink-peeled portion in the tested portion was not smaller than the area of the ink-non-peeled portion in the tested portion.

The evaluation rating A+, A, A–, B+or B shows that the water-based ink had good rub fastness upon practical use.
<Water Resistance>

Ion-exchanged water was impregnated into a Johnson's cotton swab available from Johnson & Johnson K. K., and the final printed material obtained on the polyvinyl chloride film was rubbed with the cotton swab by moving the cotton swab over the printed surface thereof by 100 reciprocative motions while applying a load of 5 g to the cotton swab. The number of the reciprocative motions of the cotton swab over the printed surface in which no change in the printed surface was observed during the test was counted, and the water resistance of the ink was evaluated according to the following evaluation ratings.
(Evaluation Ratings)

A: No change occurred.

B: Change occurred by 90 to 99 reciprocative motions.

B–: Change occurred by 80 to 89 reciprocative motions.

C: Change occurred by 70 to 79 reciprocative motions.

D: Change occurred by 1 to 69 reciprocative motions.

The evaluation rating A shows that the water-based ink had sufficient water resistance.

<Solvent (Ethanol) Resistance>

Ethanol aqueous solutions were prepared such that ethanol concentrations of the respective solutions were increased at intervals of 5% in the range of from 10 to 100%. The thus prepared ethanol aqueous solutions were respectively impregnated into a Johnson's cotton swab available from Johnson & Johnson K. K., and the final printed material obtained on the polyvinyl chloride film was rubbed with the cotton swab by moving the cotton swab over the printed surface thereof by 10 reciprocative motions while applying a load of 5 g to the cotton swab. The rubbing test was conducted to measure the ethanol concentration of the ethanol aqueous solution in which the printed surface suffered from no change during the test, and the solvent resistance of the ink was evaluated from the test results according to the following evaluation ratings.

(Evaluation Ratings)

A+: Not less than 70%.

A: Not less than 65% and less than 70%.

A−: Not less than 60% and less than 65%.

B+: Not less than 55% and less than 60%.

B: Not less than 50% and less than 55%.

B−: Not less than 45% and less than 50%.

C: Not less than 40% and less than 45%.

D: Less than 40%.

The evaluation rating A shows that the water-based ink had sufficient solvent resistance.

<Adhesion to Substrate>

The adhesion of the water-based ink to a substrate was evaluated by a cross-cut adhesion test according to JIS K 5400. More specifically, the printed surface of the final printed material obtained on the polyvinyl chloride film was cut by a cutter knife until a cut depth of the cutter knife reached a base material to form 11 cut lines and 100 crosscuts thereon. Then, a Cellotape (registered trademark) was strongly attached onto a crosscut-formed portion of the printed surface, and rapidly peeled off at a peel angle of 45° from an edge of the attached tape to compare the condition of the crosscuts with that before the test and thereby evaluate adhesion of the ink to a substrate according to the following evaluation ratings.

(Evaluation Ratings)

A+: No peeling occurred.

A: Only small peeling of the printed portions was observed at intersection of the cut lines on the printed surface.

A−: Residual rate of the crosscuts was not less than 95%.

B+: Residual rate of the crosscuts was not less than 90% and less than 95%.

B: Residual rate of the crosscuts was not less than 85% and less than 90%.

B−: Residual rate of the crosscuts was not less than 80% and less than 85%.

C: Residual rate of the crosscuts was not less than 70% and less than 80%.

D: Residual rate of the crosscuts was less than 70%.

The evaluation rating A+, A, A−, B+ or B shows that the water-based ink had good adhesion to a substrate upon practical use.

TABLE 2

| | | Ink compositions of Examples (unit: part(s) by mass) | | | | | | | | | | |
|---|---|---|---|---|---|---|---|---|---|---|---|---|
| Kinds of water-based inks | | 1 | 2 | 3 | 4 | 5 | 6 | 7 | 8 | 9 | 10 | 11 |
| Particles A | Pigment dispersion A-1C | 26.0 | 26.0 | 26.0 | 26.0 | 26.0 | 26.0 | 26.0 | 26.0 | 26.0 | | 26.0 |
| | Pigment dispersion A-2C | | | | | | | | | | 26.0 | |
| | Pigment dispersion A-3M | | | | | | | | | | | |
| | Pigment dispersion A-4M | | | | | | | | | | | |
| | Pigment dispersion A-5Y | | | | | | | | | | | |
| | Pigment dispersion A-6Y | | | | | | | | | | | |
| | Pigment dispersion A-7B | | | | | | | | | | | |
| | Pigment dispersion AX | | | | | | | | | | | |
| Particles B | B-1 VINYBLAN | 13.3 | 13.3 | 13.3 | 13.3 | 13.3 | | 13.3 | 13.3 | 13.3 | 13.3 | |
| | B-2 NeoCryl | | | | | | 9.1 | | | | | |
| | B-3 Polyester resin | | | | | | | | | | | 10.0 |
| | B-4 NeoRez 9603 | | | | | | | | | | | |
| | BX1 JONCRYL 690 | | | | | | | | | | | |
| | BX2 ACRIT | | | | | | | | | | | |
| Organic solvent C | BDG | 5.0 | | 5.0 | 5.0 | 5.0 | 5.0 | 3.0 | 10.0 | 20.0 | 5.0 | 5.0 |
| | iBDG | | 5.0 | | | | | | | | | |
| | Propylene glycol | 30.0 | 30.0 | 20.0 | 20.0 | 20.0 | 30.0 | 32.0 | 25.0 | 15.0 | 30.0 | 30.0 |
| | 1,2-Butanediol | | | 10.0 | | | | | | | | |
| | 1,3-Butanediol | | | | 10.0 | | | | | | | |
| | MDG | | | | | 10.0 | | | | | | |
| | BTG | | | | | | | | | | | |
| | Glycerin | | | | | | | | | | | |
| Others | A: EMULGEN 120 | 0.5 | 0.5 | 0.5 | 0.5 | 0.5 | 0.5 | 0.5 | 0.5 | 0.5 | 0.5 | 0.5 |
| | B: SURFYNOL | 0.5 | 0.5 | 0.5 | 0.5 | 0.5 | 0.5 | 0.5 | 0.5 | 0.5 | 0.5 | 0.5 |
| | 1N NaOH | 0.01 | 0.01 | 0.01 | 0.01 | 0.01 | 0.01 | 0.01 | 0.01 | 0.01 | 0.01 | 0.01 |
| | Ion-exchanged water | 24.7 | 24.7 | 24.7 | 24.7 | 24.7 | 28.9 | 24.7 | 24.7 | 24.7 | 24.7 | 28.0 |
| | Content of water *1 | 54.3 | 54.3 | 54.3 | 54.3 | 54.3 | 54.3 | 54.3 | 54.3 | 54.3 | 54.3 | 54.3 |

TABLE 2-continued (unit: part(s) by mass)

Ink compositions of Examples

| | Kinds of water-based inks | 12 | 13 | 14 | 15 | 16 | 17 | 18 | 19 | 20 | 21 |
|---|---|---|---|---|---|---|---|---|---|---|---|
| Particles A | Pigment dispersion A-1C | | | | | | 26.0 | 26.0 | 26.0 | 45.5 | 45.5 |
| | Pigment dispersion A-2C | | | | | | | | | | |
| | Pigment dispersion A-3M | 26.0 | | | | | | | | | |
| | Pigment dispersion A-4M | | 26.0 | | | | | | | | |
| | Pigment dispersion A-5Y | | | 26.0 | | | | | | | |
| | Pigment dispersion A-6Y | | | | 26.0 | | | | | | |
| | Pigment dispersion A-7B | | | | | 26.0 | | | | | |
| | Pigment dispersion AX | | | | | | | | | | |
| Particles B | B-1 VINYBLAN | 13.3 | 13.3 | 13.3 | 13.3 | 13.3 | | 13.3 | 13.3 | 6.7 | 6.7 |
| | B-2 NeoCryl | | | | | | | | | | |
| | B-3 Polyester resin | | | | | | | | | | |
| | B-4 NeoRez 9603 | | | | | | 11.4 | | | | |
| | BX1 JONCRYL 690 | | | | | | | | | | |
| | BX2 ACRIT | | | | | | | | | | |
| Organic solvent C | BDG | 5.0 | 5.0 | 5.0 | 5.0 | 5.0 | 5.0 | 3.0 | 1.0 | 5.0 | 1.0 |
| | iBDG | | | | | | | | | | |
| | Propylene glycol | 30.0 | 30.0 | 30.0 | 30.0 | 30.0 | 30.0 | 25.0 | 25.0 | 25.0 | 25.0 |
| | 1,2-Butanediol | | | | | | | | | | |
| | 1,3-Butanediol | | | | | | | | | | |
| | MDG | | | | | | | | | | |
| | BTG | | | | | | | | | | |
| | Glycerin | | | | | | | | | | |
| Others | A: EMULGEN 120 | 0.5 | 0.5 | 0.5 | 0.5 | 0.5 | 0.5 | 0.5 | 0.5 | 0.5 | 0.5 |
| | B: SURFYNOL | 0.5 | 0.5 | 0.5 | 0.5 | 0.5 | 0.5 | 0.5 | 0.5 | 0.5 | 0.5 |
| | 1N NaOH | 0.01 | 0.01 | 0.01 | 0.01 | 0.01 | 0.01 | 0.01 | 0.01 | 0.01 | 0.01 |
| | Ion-exchanged water | 24.7 | 24.7 | 24.7 | 24.7 | 24.7 | 26.6 | 31.7 | 33.7 | 16.8 | 20.8 |
| | Content of water *1 | 54.3 | 54.3 | 54.3 | 54.3 | 54.3 | 54.3 | 61.3 | 63.3 | 57.0 | 61.0 |

Note
*1: Content of water in water-based ink (% by mass)

TABLE 3

(unit: part(s) by mass)

Ink compositions of Comparative Examples

| | Kinds of water-based inks | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|
| Particles A | Pigment dispersion A-1C | 26.0 | 26.0 | 26.0 | 26.0 | | | | | | 26.0 | | 26.0 | 26.0 | 26.0 | 26.0 |
| | Pigment dispersion A-2C | | | | | | | | | | | | | | | |
| | Pigment dispersion A-3M | | | | | | | | | | | | | | | |
| | Pigment dispersion A-4M | | | | | | | | | | | | | | | |
| | Pigment dispersion A-5Y | | | | | | | | | | | | | | | |
| | Pigment dispersion A-6Y | | | | | | | | | | | | | | | |
| | Pigment dispersion A-7B | | | | | | | | | | | | | | | |
| | Pigment dispersion AX | | | | | 26.0 | 26.0 | 26.0 | 26.0 | 26.0 | | 26.0 | | | | |
| Particles B | B-1 VINYBLAN | | | 13.3 | 13.3 | 13.3 | 13.3 | 13.3 | 13.3 | 13.3 | 13.3 | 13.3 | 13.3 | 13.3 | 13.3 | |
| | B-2 NeoCryl | | | | | | | | | | | | | | | |
| | B-3 Polyester resin | | | | | | | | | | | | | | | |
| | B-4 NeoRez 9603 | | | | | | | | | | | | | | | |
| | BX1 JONCRYL 690 | | | | | | | | | | | | | | | 20 |
| | BX2 ACRIT | | 13.3 | | | | | | | | | | | | | |
| Organic solvent C | BDG | 5.0 | 5.0 | | | 5.0 | | 5.0 | 5.0 | | 5.0 | | 5.0 | 5.0 | 5.0 | 5.0 |
| | iBDG | | | | | | 5.0 | | | | | | | | | |
| | Propylene glycol | 30.0 | 30.0 | 30.0 | 35.0 | 30.0 | 30.0 | 20.0 | 20.0 | 20.0 | 20.0 | 35.0 | | 30.0 | 30.0 | |
| | 1,2-Butanediol | | | | | | | 10.0 | | | | | 20.0 | | 5.0 | 5.0 |
| | 1,3-Butanediol | | | | | | | | 10.0 | | | | | 30.0 | | |
| | MDG | | | | | | | | | 10.0 | | | 10.0 | | 10.0 | |
| | BTG | | | 5.0 | | | | | | | | | | | | |
| | Glycerin | | | | | | | | | | 10.0 | | | | | |
| Others | A: EMULGEN 120 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | B: SURFYNOL | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 1N NaOH | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| | Ion-exchanged water | 38.0 | 24.7 | 24.7 | 24.7 | 24.7 | 24.7 | 24.7 | 24.7 | 29.7 | 24.7 | 24.7 | 24.7 | 24.7 | 9.69 | 18 |
| | Content of water *1 | 58.3 | 54.3 | 54.3 | 54.3 | 54.3 | 54.3 | 54.3 | 54.3 | 54.3 | 54.3 | 54.3 | 54.3 | 54.3 | 39.3 | 54.3 |

Note
*1: Content of water in water-based ink (% by mass)

TABLE 4

|  |  | Examples | | | | | | | | | | |
|---|---|---|---|---|---|---|---|---|---|---|---|
|  |  | 1 | 2 | 3 | 4 | 5 | 6 | 7 | 8 | 9 | 10 | 11 |
| Kinds of water-based inks | | 1 | 2 | 3 | 4 | 5 | 6 | 7 | 8 | 9 | 10 | 11 |
| Evaluation of inks and printed materials | Storage stability | A | A | A | A | A⁻ | A⁻ | A | A⁻ | A⁻ | A⁻ | A |
| | Ejection stability | A | A | A | A | B | A | A | B | B | A | A |
| | Image quality (PVC) | A⁻ | A⁻ | A⁻ | A⁻ | A | B | B | A | A | A⁻ | A |
| | Image quality (PP) | A | A | A⁻ | A⁻ | A | A⁻ | A⁻ | A | A⁻ | A | A |
| | Image quality (PET) | A | A | A | A | A | A | A⁻ | A | A | A | A |
| | Rub fastness (PVC) | A | A | B⁺ | B⁺ | A | A | A | A | A | A | A |
| | Rub fastness (PP) | A | A | B⁺ | B⁺ | A | A | A | A | A | A | A |
| | Rub fastness (PET) | A | A | B | B | A | B | A | B | B | A | A |
| | Water resistance | A | A | A | A | A | A | A | A | A | A | A |
| | Solvent resistance | A | A | A | A | A | A | A | A | A | A | B |
| | Adhesion to substrate | A | A | B | B | A | A⁻ | A | A⁻ | A⁻ | A | B |

|  |  | Examples | | | | | | | | | |
|---|---|---|---|---|---|---|---|---|---|---|---|
|  |  | 12 | 13 | 14 | 15 | 16 | 17 | 18 | 19 | 20 | 21 |
| Kinds of water-based inks | | 12 | 13 | 14 | 15 | 16 | 17 | 18 | 19 | 20 | 21 |
| Evaluation of inks and printed materials | Storage stability | A | A | A | A | A | A | A | A | A | A |
| | Ejection stability | A | A | A | A | A | A | A | A | B | A |
| | Image quality (PVC) | A | A | A | A | A | A⁻ | B | B | B | B |
| | Image quality (PP) | A | A | A | A | A | A | A⁻ | A⁻ | A⁻ | A⁻ |
| | Image quality (PET) | A | A | A | A | A | A | A | A⁻ | A | A⁻ |
| | Rub fastness (PVC) | A | A⁻ | A | A | B⁺ | A | A | A | B⁺ | B⁺ |
| | Rub fastness (PP) | A | A⁻ | A | A | B⁺ | B⁺ | A | A | B⁺ | B⁺ |
| | Rub fastness (PET) | A | A⁻ | A | A | B⁺ | A | A | A | A | A |
| | Water resistance | A | A | A | A | A | A | A | A | A | A |
| | Solvent resistance | A | A | A | A | A | A | A | A | A | A |
| | Adhesion to substrate | A | A | A | A | A | B | A | A | B | B |

TABLE 5

|  |  | Comparative Examples | | | | | | | | | | | | | | |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 |
| Kinds of water-based inks | | 22 | 23 | 24 | 25 | 26 | 27 | 28 | 29 | 30 | 31 | 32 | 33 | 34 | 35 | 36 |
| Evaluation of inks and printed materials | Storage stability | A | B | A | A | D | D | D | D | D | A | A | A | A⁻ | C | C |
| | Ejection stability | A | C | A | A⁺ | C | C | C | C | C | A | D | B | A | C | C |
| | Image quality (PVC) | C | A⁻ | B | D | B | B | A⁻ | B | C | C | D | A⁻ | A⁻ | C | B |
| | Image quality (PP) | B | A | A⁻ | D | A⁻ | A⁻ | A⁻ | A⁻ | C | C | D | A | A | C | B |
| | Image quality (PET) | A | A | A⁻ | D | A | A | A⁻ | A⁻ | C | C | D | A | A | B | B |
| | Rub fastness (PVC) | D | A | B⁻ | A⁺ | A | A | B⁺ | B⁺ | A | D | A⁺ | B⁻ | B⁻ | C | C |
| | Rub fastness (PP) | D | A | B⁻ | A⁺ | A | A | B⁺ | B⁺ | A | D | A⁺ | B⁻ | B⁻ | C | C |
| | Rub fastness (PET) | D | A | B⁻ | A⁺ | A | A | B | B | A | D | A⁺ | B⁻ | B⁻ | C | C |
| | Water resistance | C | D | B⁻ | A | A | A | B | B | A | D | A | B⁻ | B⁻ | B⁻ | C |
| | Solvent resistance | C | D | B | A⁺ | A | A | A | A | A | D | A⁺ | B | B⁻ | B⁻ | C |
| | Adhesion to substrate | C | A | C | A⁺ | A | A | B | B | A | D | A⁺ | C | C | C | C |

As apparently recognized from the evaluation results shown in Tables 4 and 5, the water-based inks obtained in Examples 1 to 21 according to the present invention exhibited clear image quality without any of bleeding and mottling (unevenness) and were also improved in rub fastness, water resistance, solvent resistance and adhesion to a substrate with a high level and a good balance while maintaining good long-term storage stability and good ejection stability of the ink upon ink-jet printing even when printed on a non-water absorbing recording medium, as compared to those water-based inks obtained in Comparative Examples 1 to 15.

The invention claimed is:

1. A water-based ink comprising pigment-containing water-insoluble polymer particles A, pigment-free water-insoluble polymer particles B, an organic solvent C and water, in which:

the pigment-containing water-insoluble polymer particles A are obtained by crosslinking pigment-containing water-insoluble polymer particles (a) in an aqueous medium;

the water-insoluble polymer particles B comprise at least one material selected from the group consisting of water-insoluble vinyl-based polymer particles, water-insoluble polyester resin particles and water-insoluble polyurethane resin particles;

the organic solvent C comprises
at least one compound selected from the group consisting of diethylene glycol monobutyl ether and diethylene glycol monoisobutyl ether, and
propylene glycol, in which a total content of diethylene glycol monobutyl ether and diethylene glycol monoisobutyl ether in the water-based ink is not less than 0.8% by mass, and a content of an organic solvent having a boiling point of higher than 250° C. in the water-based ink is not more than 1% by mass; and a content of water in the water-based ink is not less than 45% by mass.

2. The water-based ink according to claim 1, wherein a content of propylene glycol in the water-based ink is not less than 10% by mass and not more than 38% by mass.

3. The water-based ink according to claim 1, wherein the pigment-containing water-insoluble polymer particles A are obtained by crosslinking the pigment-containing water-insoluble polymer particles (a) with a compound comprising two or more epoxy groups in a molecule thereof.

4. The water-based ink according to claim 3, wherein the compound comprising two or more epoxy groups in a molecule thereof is ethylene glycol diglycidyl ether or trimethylolpropane polyglycidyl ether.

5. The water-based ink according to claim 1, wherein a water-insoluble polymer P1 constituting the pigment-containing water-insoluble polymer particles (a) is a vinyl-based polymer that is obtained by copolymerizing a monomer mixture comprising an ionic monomer (a) and a hydrophobic monomer (b).

6. The water-based ink according to claim 1, wherein a crosslinking rate of the pigment-containing water-insoluble polymer particles A is not less than 10 mol % and not more than 80 mol %.

7. The water-based ink according to claim 1, wherein a water-insoluble polymer P2 constituting the water-insoluble polymer particles B is an acrylic polymer.

8. The water-based ink according to claim 1, wherein a water-insoluble polymer P2 constituting the water-insoluble polymer particles B has a glass transition temperature of not lower than 0° C. and not higher than 90° C.

9. The water-based ink according to claim 1, wherein a content of the water-insoluble polymer particles B in the water-based ink is not less than 1.0% by mass and not more than 7.0% by mass.

10. The water-based ink according to claim 1, wherein a content of the organic solvent C in the water-based ink is not less than 40% by mass and not more than 80% by mass on the basis of a total amount of water and the organic solvent C.

11. The water-based ink according to claim 1, wherein a total content of the at least one compound selected from the group consisting of diethylene glycol monobutyl ether and diethylene glycol monoisobutyl ether in the water-based ink is not more than 20% by mass.

12. The water-based ink according to claim 1, wherein the water-based ink is used for ink-jet printing.

13. An ink-jet printing method comprising the step of printing characters or images on a recording medium using a water-based ink, in which:

the water-based ink comprises pigment-containing water-insoluble polymer particles A, pigment-free water-insoluble polymer particles B, an organic solvent C and water;

the pigment-containing water-insoluble polymer particles A are obtained by crosslinking pigment-containing water-insoluble polymer particles (a) in an aqueous medium;

the water-insoluble polymer particles B comprise at least one material selected from the group consisting of water-insoluble vinyl-based polymer particles, water-insoluble polyester resin particles and water-insoluble polyurethane resin particles;

the organic solvent C comprises at least one compound selected from the group consisting of diethylene glycol monobutyl ether and diethylene glycol monoisobutyl ether, and propylene glycol, in which a total content of diethylene glycol monobutyl ether and diethylene glycol monoisobutyl ether in the water-based ink is not less than 3% by mass, and a content of an organic solvent having a boiling point of higher than 250° C. in the water-based ink is not more than 1% by mass;

a content of water in the water-based ink is not less than 45% by mass; and a water absorption of the recording medium is not less than 0 g/m$^2$ and not more than 2.5 g/m$^2$ as measured in a pure water contact time of 100 milliseconds.

14. The ink-jet printing method according to claim 13, wherein the recording medium is at least one material selected from the group consisting of a polyester film, a polyvinyl chloride film, a polypropylene film, a polyethylene film and a nylon film.

* * * * *